US011160250B2

United States Patent
Yoo et al.

(10) Patent No.: US 11,160,250 B2
(45) Date of Patent: Nov. 2, 2021

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 16/571,090

(22) Filed: Sep. 14, 2019

(65) Prior Publication Data

US 2020/0085005 A1    Mar. 19, 2020

Related U.S. Application Data

(60) Provisional application No. 62/733,393, filed on Sep. 19, 2018.

(30) Foreign Application Priority Data

Oct. 17, 2018 (KR) .................. 10-2018-0123552
Jul. 4, 2019 (KR) .................. 10-2019-0080603

(51) Int. Cl.
*A01K 7/02* (2006.01)
*B67D 1/10* (2006.01)
(Continued)

(52) U.S. Cl.
CPC ............ *A01K 7/025* (2013.01); *B67D 1/0004* (2013.01); *B67D 1/10* (2013.01); *B67D 1/165* (2013.01)

(58) Field of Classification Search
CPC .......... A01K 7/025; B67D 1/10; B67D 1/165; B67D 1/0004
See application file for complete search history.

(56) References Cited

U.S. PATENT DOCUMENTS 3,303,824 A    2/1967  Anderson
3,765,614 A    10/1973 Bartl et al.
(Continued)

FOREIGN PATENT DOCUMENTS

CA    2082083    5/1994
CN    2351955    12/1999
(Continued)

OTHER PUBLICATIONS

U.S. Appl. No. 16/574,240, filed Sep. 18, 2419.
(Continued)

*Primary Examiner* — Donnell A Long
(74) *Attorney, Agent, or Firm* — Ked & Associates LLP

(57) ABSTRACT

A liquid dispenser may include a water tank having a wall opened at an upper side, a pump provided inside the water tank, a water supply pipe connected to the pump to transfer water, a water supply plate provided at a position higher than the wall of the water tank and having a water supply hole communicating with the water supply pipe and an upper surface over which water supplied from the water supply hole flows, and a water guide formed within the opening of the wall of the water tank and spaced apart from and below the water supply plate. The water guide may have a hole to discharge the water dropped from the water supply plate to the water tank and to filter the water.

23 Claims, 12 Drawing Sheets

(51) Int. Cl.
*B67D 1/16* (2006.01)
*B67D 1/00* (2006.01)

(56) References Cited

U.S. PATENT DOCUMENTS

| | | | |
|---|---|---|---|
| 4,100,885 A * | 7/1978 | Kapplinger | A01K 7/025 |
| | | | 119/73 |
| 4,286,546 A | 9/1981 | Moore | |
| 4,561,384 A | 12/1985 | Liff | |
| 4,640,226 A | 2/1987 | Liff | |
| 4,932,561 A | 6/1990 | Boxall | |
| 5,105,771 A * | 4/1992 | Schafer | A01K 7/027 |
| | | | 119/73 |
| 5,140,134 A | 8/1992 | Reusche et al. | |
| 5,174,245 A * | 12/1992 | Bishop | A01K 7/00 |
| | | | 119/73 |
| 5,345,063 A | 9/1994 | Reusche et al. | |
| 5,799,609 A | 9/1998 | Burns et al. | |
| 5,884,582 A | 3/1999 | Duckworth | |
| 6,230,653 B1 | 5/2001 | Tobin | |
| 6,622,657 B2 | 9/2003 | Northrop et al. | |
| 6,848,392 B1 | 2/2005 | Kreutzer, Jr. | |
| 7,089,881 B2 | 8/2006 | Plante | |
| 7,270,082 B2 | 9/2007 | Plante | |
| 7,743,698 B2 | 6/2010 | Muir et al. | |
| 7,823,538 B1 | 11/2010 | Merager | |
| 8,117,991 B1 | 2/2012 | Civitillo | |
| 8,210,447 B2 | 7/2012 | Cohen | |
| 8,770,147 B2 | 7/2014 | Rowe | |
| 9,497,930 B2 | 11/2016 | Lipscomb et al. | |
| 10,165,753 B1 | 1/2019 | Huang | |
| 2003/0140864 A1 * | 7/2003 | Wenstrand | A01K 7/027 |
| | | | 119/73 |
| 2003/0213437 A1 * | 11/2003 | Norris | A01K 7/02 |
| | | | 119/74 |
| 2005/0166853 A1 | 8/2005 | Plante | |
| 2006/0174838 A1 | 8/2006 | Plante | |
| 2006/0231040 A1 * | 10/2006 | Bast | A01K 7/02 |
| | | | 119/77 |
| 2007/0045159 A1 | 3/2007 | Lee | |
| 2007/0199512 A1 | 8/2007 | Ellis | |
| 2007/0227456 A1 | 10/2007 | Borey | |
| 2008/0078330 A1 | 4/2008 | McCallum et al. | |
| 2008/0190374 A1 | 8/2008 | Farris | |
| 2010/0095897 A1 | 4/2010 | Rowe | |
| 2010/0300366 A1 | 12/2010 | Lipscomb et al. | |
| 2011/0067638 A1 | 3/2011 | Lipscomb et al. | |
| 2011/0102945 A1 | 5/2011 | Isono et al. | |
| 2012/0017839 A1 | 1/2012 | Veness et al. | |
| 2012/0111280 A1 * | 5/2012 | Shin, II | A01K 7/027 |
| | | | 119/78 |
| 2012/0216751 A1 | 8/2012 | Rowe | |
| 2013/0087102 A1 | 4/2013 | Lipscomb et al. | |
| 2013/0092090 A1 | 4/2013 | McCallum | |
| 2013/0228132 A1 | 9/2013 | Lipscomb et al. | |
| 2014/0053781 A1 | 2/2014 | Lewis | |
| 2014/0076242 A1 | 3/2014 | Ho | |
| 2014/0251223 A1 | 9/2014 | Rowe et al. | |
| 2014/0353335 A1 | 12/2014 | Van Diepen | |
| 2015/0189862 A1 | 7/2015 | Lipscomb | |
| 2015/0313180 A1 | 11/2015 | Lipscomb et al. | |
| 2015/0353335 A1 | 12/2015 | Breault | |
| 2016/0000037 A1 | 1/2016 | Lipscomb et al. | |
| 2016/0118179 A1 | 4/2016 | Park et al. | |
| 2016/0159633 A1 | 6/2016 | Diffenderfer | |
| 2016/0286757 A1 | 10/2016 | Armstrong | |
| 2017/0245465 A1 | 8/2017 | Oates et al. | |
| 2018/0160648 A1 | 6/2018 | Goh | |
| 2019/0075755 A1 * | 3/2019 | Imaizumi | A01K 7/025 |
| 2019/0227580 A1 * | 7/2019 | von der Assen | G05D 16/2026 |
| 2019/0239491 A1 | 8/2019 | Yu et al. | |
| 2020/0337266 A1 | 10/2020 | Yu et al. | |

FOREIGN PATENT DOCUMENTS

| | | | |
|---|---|---|---|
| CN | 1701206 | 11/2005 | |
| CN | 2776044 | 5/2006 | |
| CN | 201422313 | 3/2010 | |
| CN | 201541568 | 8/2010 | |
| CN | 101816289 | 9/2010 | |
| CN | 101841191 | 9/2010 | |
| CN | 102480927 | 5/2012 | |
| CN | 202722224 | 2/2013 | |
| CN | 202873523 | 4/2013 | |
| CN | 203136752 | 8/2013 | |
| CN | 203544552 | 4/2014 | |
| CN | 203618522 | 6/2014 | |
| CN | 103917147 | 7/2014 | |
| CN | 103931515 | 7/2014 | |
| CN | 204707695 | 10/2015 | |
| CN | 204722018 | 10/2015 | |
| CN | 105265331 | 1/2016 | |
| CN | 205005702 | 2/2016 | |
| CN | 105792644 | 7/2016 | |
| CN | 205431490 | 8/2016 | |
| CN | 205682161 | 11/2016 | |
| CN | 106172064 | 12/2016 | |
| CN | 106212310 | 12/2016 | |
| CN | 205830734 | 12/2016 | |
| CN | 106332801 | 1/2017 | |
| CN | 205884322 | 1/2017 | |
| CN | 206227319 | 6/2017 | |
| CN | 106962218 | 7/2017 | |
| CN | 206314381 | 7/2017 | |
| CN | 107041318 | 8/2017 | |
| CN | 107124043 | 9/2017 | |
| CN | 107509653 | 12/2017 | |
| CN | 206699096 | 12/2017 | |
| CN | 206760412 | 12/2017 | |
| CN | 206760441 | 12/2017 | |
| CN | 107568092 | 1/2018 | |
| CN | 206851699 | 1/2018 | |
| CN | 206949206 | 2/2018 | |
| CN | 107821202 | 3/2018 | |
| CN | 107897027 | 4/2018 | |
| CN | 207411173 | 5/2018 | |
| CN | 207443927 | 6/2018 | |
| CN | 207519400 | 6/2018 | |
| CN | 108271728 | 7/2018 | |
| CN | 108353810 | 8/2018 | |
| CN | 108377928 | 8/2018 | |
| CN | 108464253 | 8/2018 | |
| CN | 207803161 | 9/2018 | |
| CN | 207803161 U * | 9/2018 | A01K 7/02 |
| CN | 207870035 | 9/2018 | |
| CN | 109997713 | 7/2019 | |
| DE | 20 2016 107 252 | 3/2018 | |
| EP | 0 894 430 | 2/1999 | |
| EP | 1 566 099 | 8/2005 | |
| EP | 3 315 022 | 5/2018 | |
| EP | 3 520 607 | 8/2019 | |
| GB | 2 458 173 | 9/2009 | |
| JP | H07-269800 | 10/1995 | |
| JP | 2012-188163 | 10/2012 | |
| JP | 2017-148018 | 8/2017 | |
| JP | 2018-057340 | 4/2018 | |
| KR | 10-2014-0042949 | 4/2014 | |
| KR | 20-0475039 | 11/2014 | |
| KR | 10-2017-0003154 | 1/2017 | |
| KR | 10-2017-0017718 | 2/2017 | |
| KR | 10-1825334 | 2/2018 | |
| RU | 2650560 | 4/2018 | |
| TW | 201641007 | 12/2016 | |
| TW | I 574614 | 3/2017 | |
| WO | WO 2011/035320 | 3/2011 | |
| WO | WO 2017/185053 | 10/2017 | |

OTHER PUBLICATIONS

U.S. Appl. No. 16/574,259, filed Sep. 18, 2019.
U.S. Appl. No. 16/574,137, filed Sep. 182,2019.

(56) References Cited

OTHER PUBLICATIONS

U.S. Appl. No. 16/571,074, filed Sep. 4, 2019.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
European Search Report dated Feb. 27, 2020 issued in Application No. 19198292.5.
European Search Report dated Feb. 27, 2020 issued in Application No. 19198298.2.
European Search Report dated Feb. 3, 2020 issued in EP Application No. 19198170.3.
European Search Report dated Apr. 17, 2020 issued in EP Application No. 19198180.2.
European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
European Search Report dated Apr. 9, 2020 issued in EP Application No. 19198174.5.
United States Office Action dated Jun. 2, 2020 issued in co-pending related U.S. Appl. No. 16/574,259.
European Search Report dated Apr. 23, 2020 issued in EP Application No. 19198303.0.
United States Office Action dated Apr. 27, 2021 issued in co-pending related U.S. Appl. No. 16/569,841.
United States Office Action dated Apr. 27, 2021 issued in co-pending related U.S. Appl. No. 16/574,418.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,418, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,090, filed Sep. 14, 2019.
U.S. Appl. No. 16/571,089, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,841, filed Sep. 13, 2019.
U.S. Appl. No. 16/569,908, filed Sep. 13, 2019.
United States Office Action dated May 11, 2021 issued in co-pending related U.S. Appl. No. 16/571,093.
Chinese Office Action dated Mar. 30, 2021 issued in CN Application No. 201910886714.X.
European Search Report dated Feb. 24, 2020 issued in EP Application No. 19198289.1.
Chinese Office Action dated Mar. 31, 2021 issued in CN Application No. 201910886533.7.
Chinese Office Action dated Apr. 1, 2021 issued in CN Application No. 201910886305.X.
Chinese Office Action dated Apr. 9, 2021 issued in CN Application No. 201910886526.7.
Chinese Office Action issued in Application No. 201910887007.2 dated Apr. 20, 2021.
Chinese Office Action issued in Application No. 201910886974.7 dated Apr. 20, 2021.
Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
Chinese Office Action dated May 17, 2021 issued in CN Application No. 201910889361.9.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
Chinese Office Action dated May 10, 2021 issued in CN Application No. 201910888718.1.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
Chinese Office Action dated May 21, 2021 issued in CN Application No. 201910888661.5.

* cited by examiner

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application Nos. 10-2019-0080603 filed on Jul. 4, 2019, and 10-2018-0123552 filed on Oct. 17, 2018, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition attachment and interest in pets. Like most animals, pets must drink water to survive and maintain a biorhythm. Since pets are often alone and since communication with their owners is difficult, the demand for pet water dispensers or water supply devices has increased.

US 2010/0095897, US 2015/0313180, EP 3315022, and KR1825334 (hereinafter referred to as "related art") disclose drinking bowls for pets. However, such drinking bowls have various disadvantages, which the present disclosure solves.

The above references are incorporated by reference herein where appropriate for appropriate teachings of additional or alternative details, features and/or technical background.

DETAILED DESCRIPTION

Figure 1:
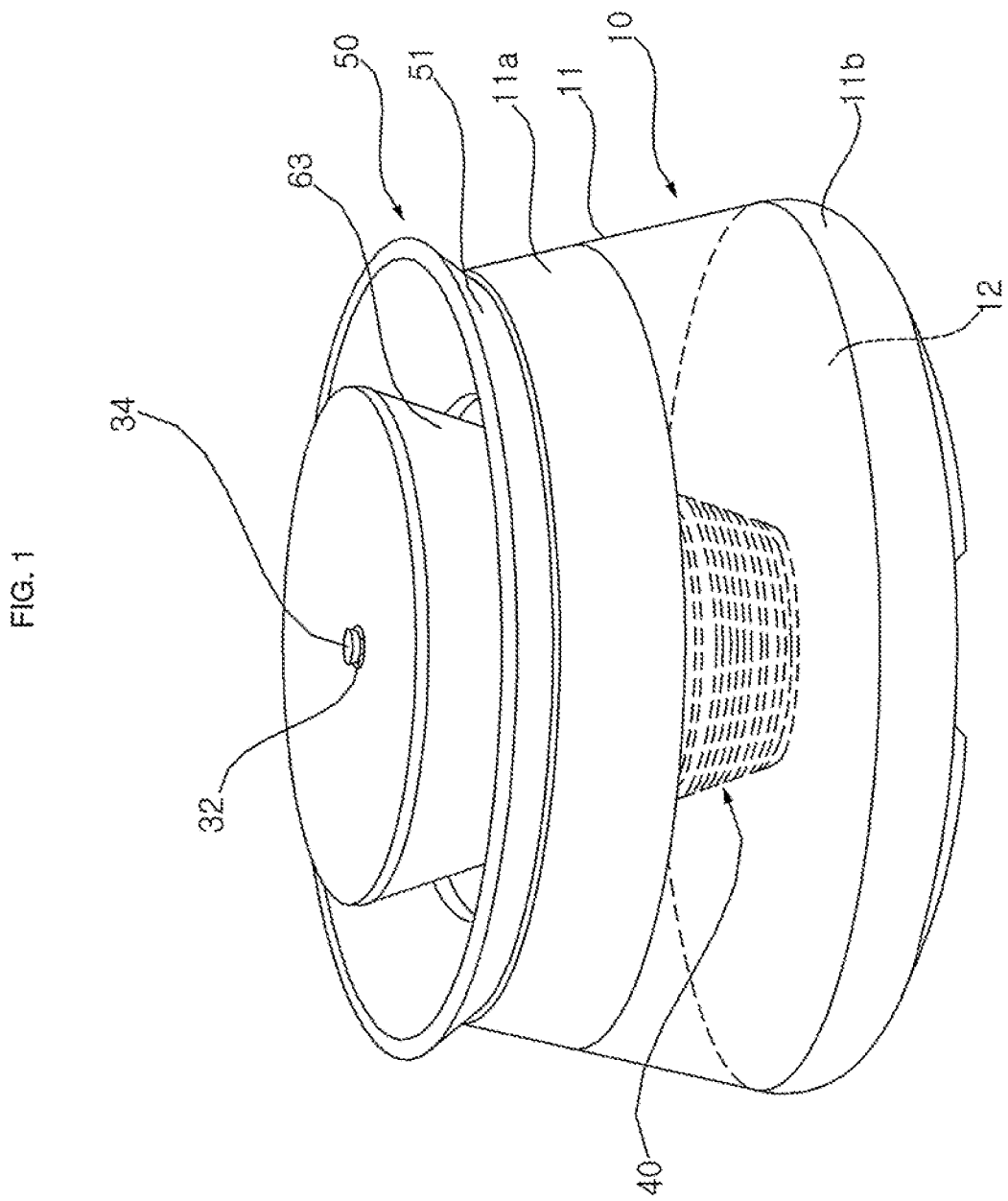
FIG. 1 is a perspective view showing an appearance of a pet water dispenser according to an embodiment.
Figure 2:
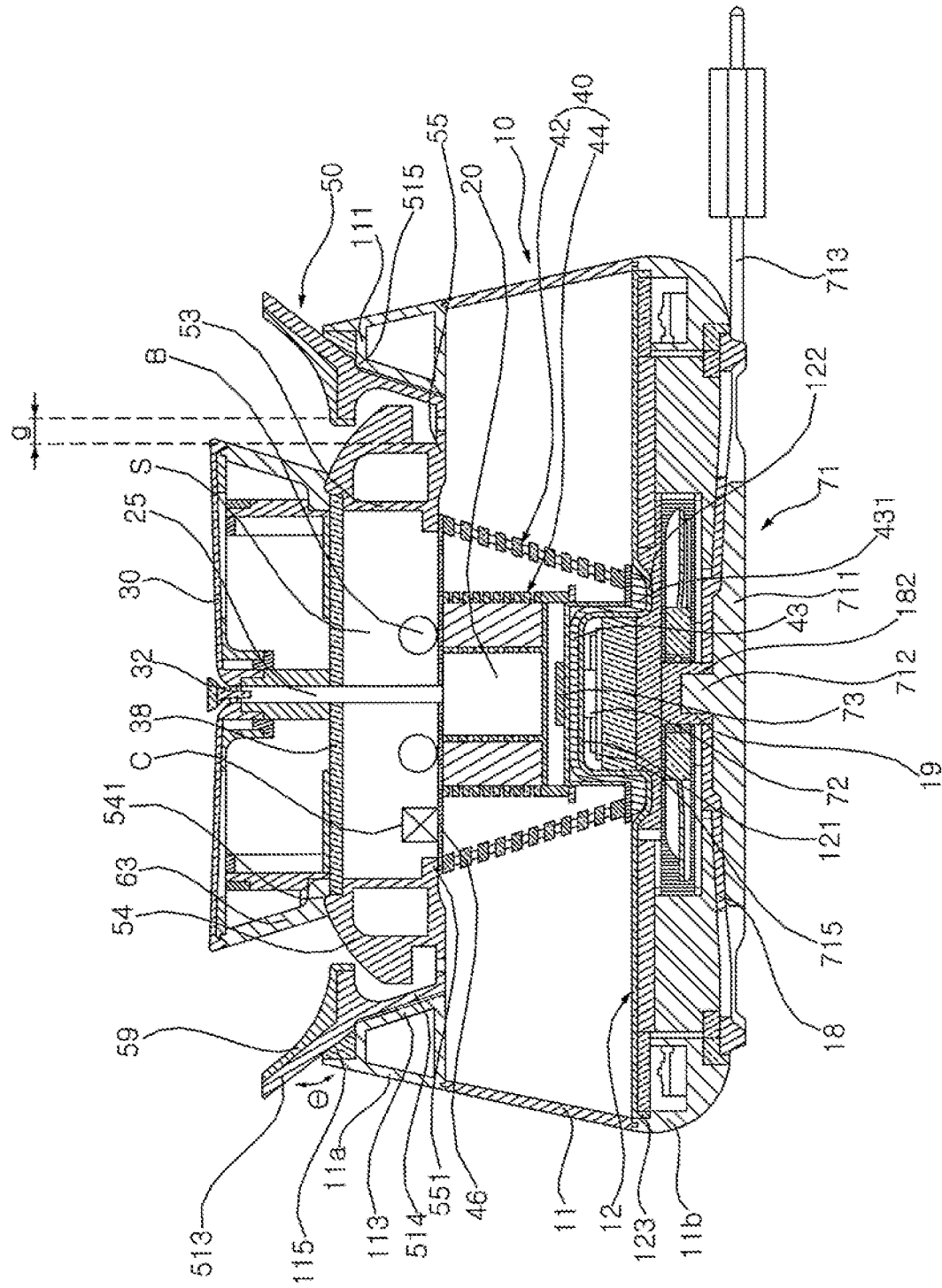
FIG. 2 is a cross-sectional view of the pet water dispenser shown in FIG. 1.
Figure 3:
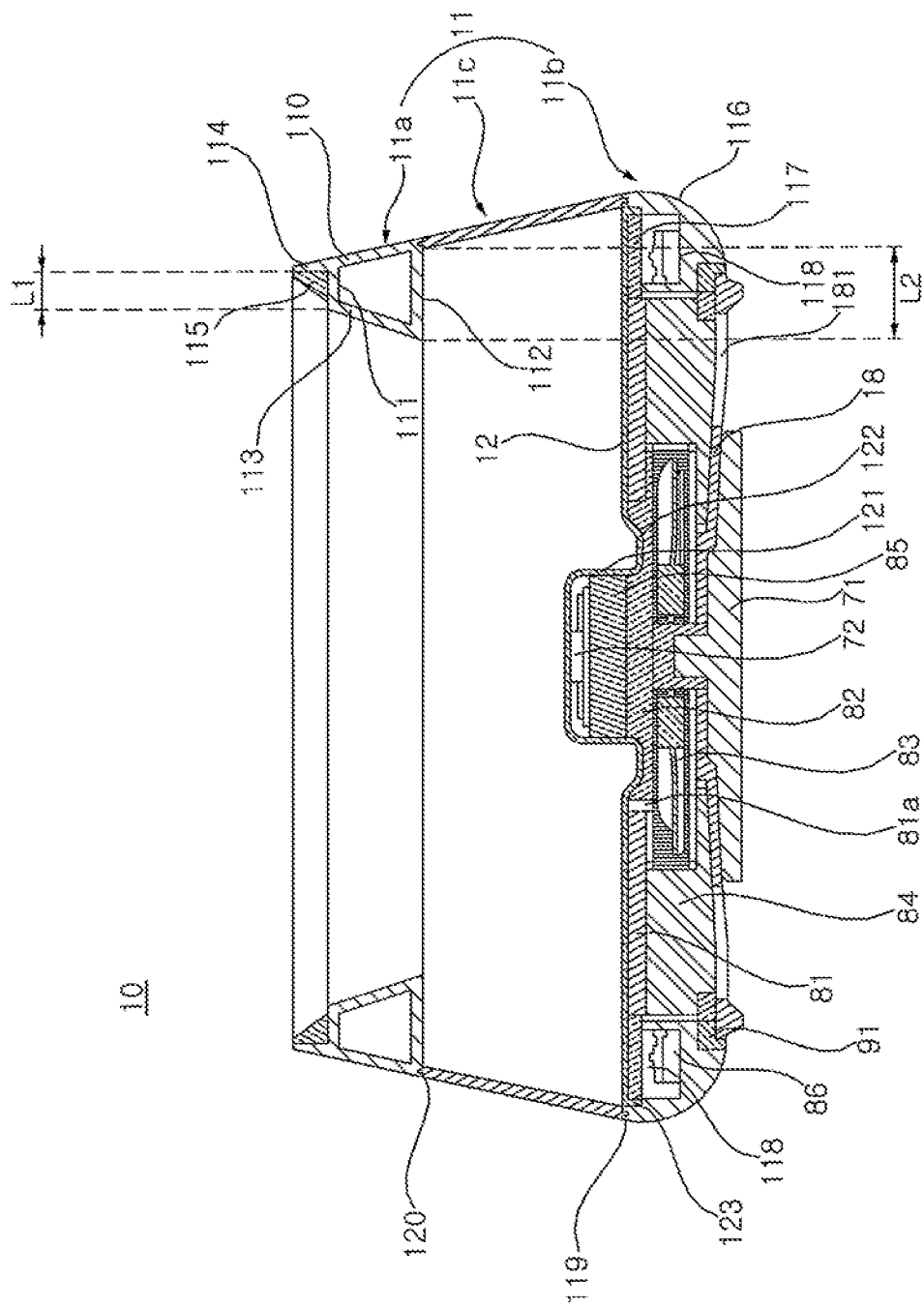
FIG. 3 is a cross-sectional view of a water tank included in an embodiment.

Referring to FIGS. 1 to 3, a liquid dispenser (e.g., water dispenser) according to an embodiment may include a water tank or water storage chamber 10 in which water is stored, a pump 20 installed in the water tank 10 to pump or supply water stored in the water tank 10 to a water supply plate or upper plate 30, a water supply pipe 25 through which the water discharged from the pump 20 flows, the water supply plate 30 over which the water supplied from the water supply pipe 25 flows, and a water guide or a water receiver 50 to guide water from the water supply plate 30 back to the water tank 10. The water guide 50 may also be referred to as a splash guard or drip tray. The water supply plate 30 may have a substantially flat or inclined upper surface, and may guide the water supplied through the water supply pipe 25 to the water guide 50. Depending on a humidity or a species of pet, the pet may drink water flowing on the upper surface of the water supply plate 30, or may drink water falling from the water supply plate 30 to the water guide 50.

The water tank 10 may be a container having an upper opening so that the user can fill water into the water tank 10 through the opened upper side or end. However, the present disclosure is not limited to a water tank 10 having an upper opening, and an additional water supply pipe (not shown) may supply water from an external source (e.g., faucet) into a closed water tank 10, and a water supply valve may open and close the additional water supply pipe.

The water tank 10 may include a bottom plate 12 and a wall 11 surrounding the bottom plate 12 and defining a side surface of the water tank 10. The wall 11 and the bottom plate 12 may form a container in which water is stored, with the bottom plate 12 defining a bottom surface of the container.

The water tank 10 may be formed in a truncated cone or trapezoidal shape having a diameter that recedes from a lower end toward an upper end as in the embodiment of the present invention, but may be formed in various shapes without being limited thereto (e.g., cylindrical shape). When the water tank 10 is formed in a truncated cone shape as described above, the water tank 10 may not be easily overturned even when an external impact is applied to the water tank 10.

The wall 11 may include a main or middle wall 11c having upper and lower ends. The wall 11 may further include an upper wall 11a and a container support 11b coupled to upper and lower open ends of the main wall 11c, respectively. The container support 11b may also be referred to as a lower wall.

The main wall 11c, the upper wall 11a and the container support 11b may be integrally made of the same material, or they may be separately manufactured as separate materials and joined together to be integrated. In particular, the upper wall 11a and the container support 11b may be manufactured from a variety of materials having excellent aesthetics, and the main wall 11c may be made of a transparent material. The main wall 11c may be a tubular wall in which upper and lower ends are open, and may be formed in a truncated cone shape such that a diameter of the main wall 11c gradually decreases from the lower end to the upper end.

As shown in FIG. 3, protrusions 119 and 120 may be formed on the upper and lower ends of the main wall 11c, respectively. The lower and upper walls 11b and 11a may include grooves to correspond to the projections 119 and 120, and the projections 119 and 120 may be inserted into the grooves of the container support 11b and the upper wall 11a, respectively. The projections 119 and 120 may further be welded or bonded to the grooves of the lower and upper walls 11b and 11a.

The upper wall 11a may extend upward from the upper end of the main wall 11c, and may similarly have an outer diameter that gradually decreases from a lower end toward an upper end of the upper wall 11a. An inclination of the upper wall 11a may correspond to an inclination of the main wall 11c so as to give a seamless outer appearance, but embodiments disclosed are not limited hereto.

The upper wall 11a may include an outer tank wall 110 having a lower end coupled to the upper end of the main wall 11c. An inclination of the outer tank wall 110 may correspond to an inclination of the main wall 11c. Alternatively, the outer tank wall 110 may be extended or protruded so as to be widened or narrowed more gradually than the main wall 11c. The inclination of the outer tank wall 110 may thus be different to the inclination of the main wall 11c.

First and second protruding plates 111 and 112 may protrude inside toward a center of the water tank 10 from an inner surface of the outer tank wall 110. The first protruding plate 111 may be provided above the second protruding plate 112, and a length of the first protruding plate 111 may be shorter than a length of the second protruding plate 112, and the second protruding plate 112 may be formed so as to protrude further inward than the first protruding plate 111 An inner diameter of a storage space in the container of the water tank 10 may be larger at the first protruding plate 111 than at the second protruding plate 112.

The first and second protruding plates 111 and 112 may be spaced apart from each other in a vertical direction of the water tank 10, while the first and second protruding plates 111 and 112 may extend in a horizontal direction or in a direction parallel to an upper surface of the bottom plate 12.

An inner inclined surface or inner tank wall 113 may extend between inner ends of the first and second protruding plates 111 and 112. The inner tank wall 113 may be inclined inward toward the center of the water tank 10 from a top end to a bottom end. Lengths and positions of the first and second protruding plates 111 and 112 may be configured to set an inclination of the inner tank wall 113.

The inner tank wall 113 may be gradually inclined inward from an upper end connected to the inner end of the first protruding plate 111 to a lower end connected to the inner end of the second protruding plate 112. The inner tank wall 113 may have a truncated cone shape in which a diameter gradually increases toward the upper end. A lower inclined surface or lower outer wall 514 of the water guide 50 described later with reference to FIG. 9 may be supported by the inner tank wall 113 so that the water guide 50 may be firmly supported by the water tank 10.

When the lower inclined surface 514 is positioned on the inner tank wall 113, the water guide 50, along with the water supply plate 30, may close the upper opening of the water tank 10, and the water guide 50 may receive water dropped from the water supply plate 30. The upper opening of the water tank 10 may be opened or exposed when the lower inclined surface 514 is separated lifted) from the inner tank wall 113.

The outer tank wall 110 of the upper wall 11a may include an upward projecting wall or extension 114 projecting upward from an outer end the first protruding plate 111 and/or the upper end of the upper wall 11a. A bumper 115 (e.g., a rubber, silicone, or elastic material) may be provided on the first stone plate 111. The bumper 115 may be attached on an inner surface of the extension 114 and/or an upper surface of the first protruding plate 111 so that the water guide 50 to be described later may be mounted on the upper wall 11a so as to contact the bumper 115. An inner circumferential surface of the bumper 115 may form an inclined surface inclined outward from a lower end to an upper end, and the inclined surface may be in close contact with an upper inclined surface 513 of the water guide 50 described later with reference to FIG. 9.

The bumper 115 may be a packing or cushioning, and may be fixed to the upper wall 11a by a ring-shaped member made of a soft material (e.g., rubber, silicone, etc.). Alternatively or in addition thereto, the bumper 115 may be fixed using an adhesive such as a pressure-sensitive adhesive (e.g., double-sided tape or a bond). In this case, a bottom surface of the bumper 115 may be attached to the first protruding plate 111, and an outer surface of the bumper 115 may be attached to an inner surface of the upper wall 11a.

A convex protruding portion or protrusion 121, which may have a hollow cylindrical shape, may protrude upward from a center of the bottom plate 12. A first wireless power transfer device 72 (e.g., a first wireless power transceiver or a transmitter) may be provided in an inner space inside the protrusion 121 below the bottom plate 12. The bottom plate 12 may be integrally formed with the wall 11, or may be separately formed and coupled to at least one of the main wall 11c or container support 11b. A ring-shaped groove or recess 122 may be formed in the bottom plate 12 to surround the protrusion 121 so as to be concave downward.

An outer circumferential surface 116 of the container support 11b may include a curved edge or corner 117 which has a downward convex curvature from the lower end of the main wall 11c. The edge 117 may curve inward from the bottom plate 12 to a bottom of the container support 11b. Viewed from above, a perimeter (or edge) of the container support 11b may be defined by the edge 117.

A mounting portion 118 may be formed in an inner space of the container support 11b to extend inward from an inner surface of the edge 117. The mounting portion 118 may include a recess or space in an upper surface, and a water level sensor 86 may be provided in the recess of the mounting portion 118. The water level sensor 86 may be a strain gauge or load sensor to sense a load applied to the bottom plate 12 of the water tank 10 (i.e., a weight of water in the water tank 10). A first controller C1 (FIG. 12) may determine a water level in the water tank 10 based on a sensed value of the water level sensor 86. In addition, various sensors such as a proximity sensor 87 (FIG. 12) and a gyro sensor 88 (FIG. 12) may be installed in the mounting portion 118 of the container support 11b. Details of the proximity sensor 87 and the gyro sensor 88 will be described later with reference to FIG. 12.

When the water level in the water tank 10 detected by the water level sensor 86 is lower than a predetermined water level value, a warning light 91 provided on the outer circumferential surface 116 of the container support lib may be turned on. The warning light 91 may be a ring-shaped light emitting diode, and may emit and pulse visible light of various wavelengths. As an example, when the water level sensor 86 is lower than a predetermined water level value, the warning light 91 may be controlled to blink red light.

The bottom plate 12 may include a base portion or horizontal surface 124 contacting the water contained in the water tank 10 and a bent portion or flange 123 bent downward from the base portion 124 and joined to the container support 11b. The bent portion 123 may be provided to be at least partially inside the mounting portion 118 so as not to interfere with the water level sensor 86. An outer surface of the bent portion 123 may contact an inner surface of the mounting portion 118 to be adjacent to the recess in the upper surface of the mounting portion 118, while the water level sensor 86 may be provided inside the recess of the mounting portion 118. Coupling of the bent portion 123 and the container support 11b may be sufficient so as to seal off an inner space of the container support 11*b*, where electronic devices (e.g., the water level sensor 86, the proximity sensor 87, the gyro sensor 88) may be provided, from a storage space of the container of the water tank 10 where water may be provided.

The protrusion 121 may be formed at a center of the base portion 124 of the bottom plate 12. The first wireless power transfer device 72 may be provided below the bottom surface of the base portion 124 in the inner space of the protrusion 121, which may be a concave space. The groove 122 may also be formed in the base portion 124 to be a recessed region surrounding the protrusion 121.

The container support lib may have a lower opening, and a base plate 18 may be placed in the lower opening to close the lower opening. The inner space of the container support 11*b* may be defined by the base plate 18 on bottom, the bottom plate 12 on top, and the container support 11*b* at the sides. The base plate 18 may be mounted on a docking station 71.

At least one filter assembly 40 to filter foreign substances in the water may be installed in the water tank 10 before the water is introduced into the pump 20. The filter assembly 40 may include a first filter 42 and a second filter 44.

Figure 4:
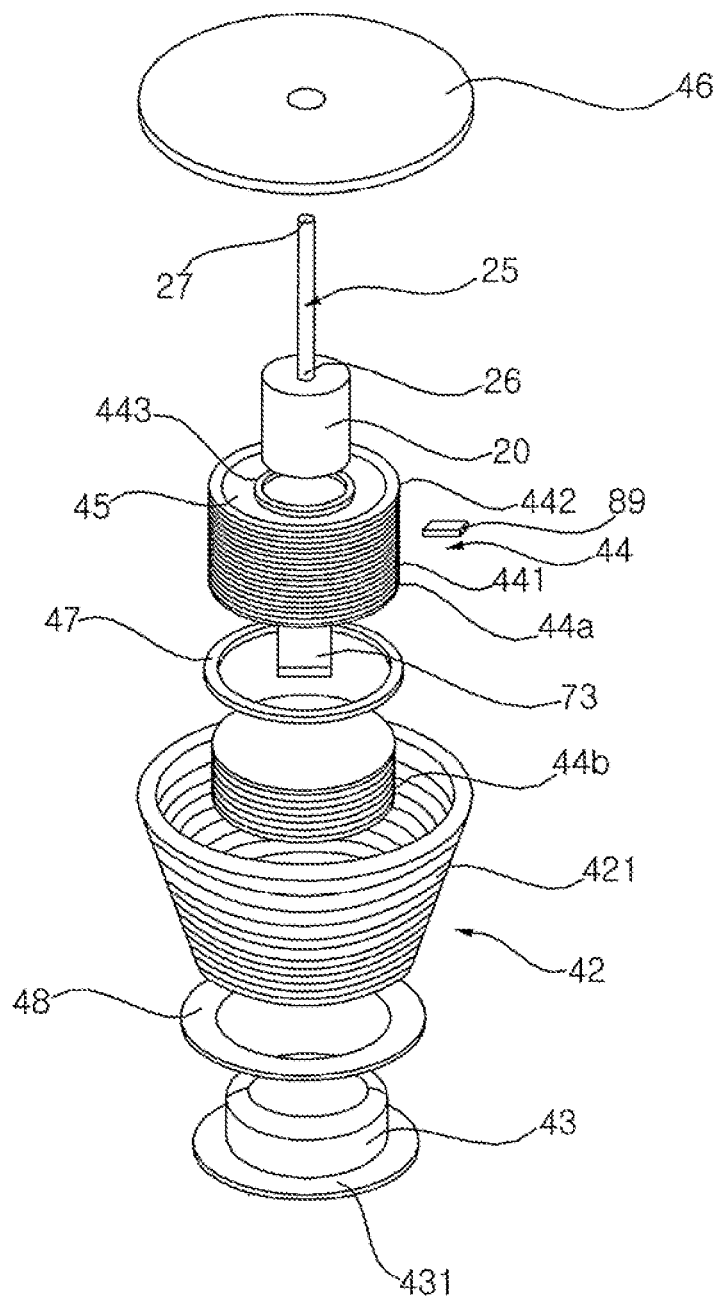
FIG. 4 is an exploded perspective view showing a filter and a pump included in an embodiment.
Figure 5:
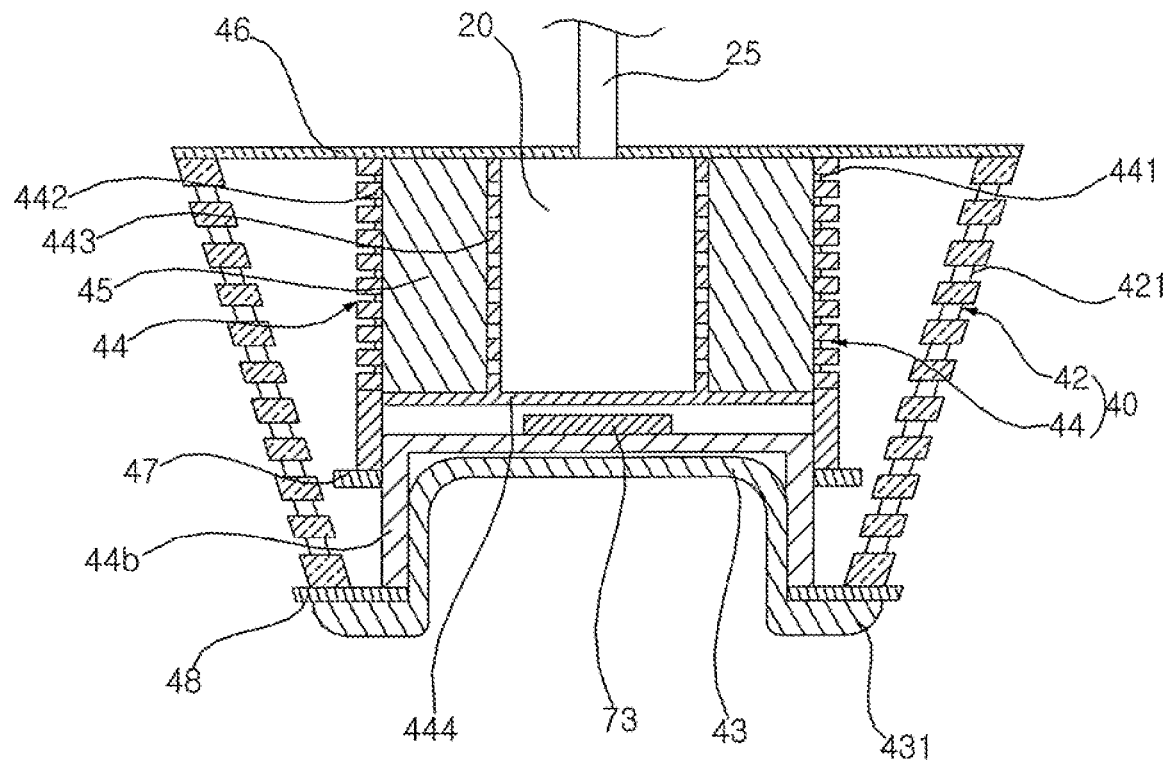
FIG. 5 is a cross-sectional view of the filter and the pump shown in FIG. 4.

Referring to FIGS. 2, 4, and 5, the first filter 42 may be a strainer having a trumpet or truncated cone shape. The first filter 42 may be formed of a rigid material (e.g., metal or plastic), and may have a plurality of water inflow ports or through holes 421. A lower filter cover or cap 43 may be installed at a lower end of the first filter 42. The lower filter cover 43 may be formed separately from the first filter 42 and later joined (e.g., bonded, welded or adhered), or alternatively may be formed and manufactures as a single body with the first filter 42.

The lower filter cover 43 may cover the protrusion 121. The lower filter cover 43 may include a cap or body 432 formed with a concave space into which the protrusion 121 is inserted, and a flange 431 extending radially outward from the lower end of the cap 432. The flange 431 may be configured to have a shape corresponding to a shape of the groove 122 surrounding the protrusion 121 so that the flange 431 may be seated in the groove 122 with the cap 432 overlaid on the protrusion 121. The lower end of the first filter 42 may coupled to an upper surface of the flange 431 so that the protrusion 121 and groove 122 may prevent the first filter 42 from being moved in a horizontal or lateral direction in the water tank 10.

The second filter 44 may be provided inside a hollow or inner space of the first filter 42. The pump 20 may be provided inside of a space of the second filter 44. The second filter 44 may have a plurality of through holes 441 communicating with a space between the first filter 42 and the second filter 44. A size of the through holes 441 of the second filter 44 may be smaller than a size of the through holes 421 of the first filter 42 so as to filter finer foreign substances than the first filter 44. Since the second filter 44 may surround the pump 20, filtration may be performed regardless of a direction in which the water flows, which may enhance performance.

The second filter 44 may include a cylindrical outer wall 442 formed with the plurality of through holes 441 and a cylindrical inner wall 442 provided inside the outer wall 442 and also having a plurality of through holes 443). The inner wall 443 may be spaced apart from the outer wall 442 so that a space formed between the outer wall 442 and the inner wall 443 may be filled with a filter medium or material 45 (e.g., a carbon filter). The filter medium 45 may be carbon particles, but is not necessarily limited thereto. For example, the filter medium 45 may be a member made of a fiber or a network structure. Since the pump 20 is provided in the inner wall 443 of the second filter 44, the filtered water may pass through the first filter 42, the second filter 44, and the filter medium 45 so that inflow of foreign matter into the pump 20 can be reliably prevented.

A support plate 444 may be further provided to close a lower side of the space filled with the filter medium 45 so that the filter medium 45 filled between the outer wall 442 and the inner wall 443 may not fall downward. An outer diameter of the support plate 444 may be substantially the same as an inner diameter of the outer wall 442.

The support plate 444 may be integrally formed with the inner wall 443 and may be configured to close a lower open end of the inner wall 443, but embodiments disclosed herein are not necessarily limited thereto and the support plate 444 may be formed separately from the inner wall 443 and later coupled to a lower end of the inner wall 443. The support plate 444 may support the pump 20 and the filter medium 45, and may divide the outer wall 442 into upper and lower sections. While the upper section of the outer wall 442 may have the through-holes 441, the lower section of the outer wall 442 may not have through holes.

A support cylinder 44*b* may be provided between the second filter 44 and the lower filter cover 43. The support cylinder 44*b* may be a hollow cylinder having an inner or concave space into which the lower filter cover 43 is inserted. The support cylinder 44*b* may be at least partially inserted into a lower opening of the second filter 44 defined by the outer wall 442. The support cylinder 44*b* may be pressed-fit into the lower section of the outer wall 441. However, embodiments disclosed are not limited to a pressed-fit coupling, and the second filter 44 may be coupled to the support cylinder 44*b* by fastening members such as screws or bolts.

The support cylinder 44*b* may be provided at a position spaced downward from the support plate 444. A sealed space may be formed between the support cylinder 44*b* and the support plate 444 because the lower section of the outer wall 442 of the second filter 44 may not include through holes. The space may be defined by an upper surface of the support cylinder 44*b* on bottom, a lower surface of the support plate 444 on top, and an inner surface of the lower section of the outer wall 442 of the second filter 44 at the sides. A second wireless power transfer device 73 (e.g., a wireless power transceiver or a receiver) may be provided in the space formed between the second filter 44 and the support cylinder 44*b*. The second wireless power transfer device 73 may align and interact with the first wireless power transfer device 72 provided under the protrusion 121.

At least one sterilizing filter or light to sterilize the water contained in the water tank 20 may be provided, and may include first to third ultraviolet (UV) lights 47, 48, and 49. The first UV light 47 may be provided to be inside the first filter 42 to irradiate ultraviolet rays (i.e., UV light) to the water flowing into the pump 20. The first UV light source 47 may be annular and may be installed at the lower end of the outer wall 442 of the second filter 44. The second UV light 48 may be provided on the lower end of the first filter 42. The second UV light 48 may be annular and may be installed between the first filter 42 and the flange 431 of the lower filter cover 43. The second UV light 48 may also be provided between the flange 431 and a lower end of the support cylinder 44*b*. The light output from the second UV light source 48 may be partially irradiated to both outside and inside of the first filter 42.

The first and second UV lights 47 and 48 may serve as coupling rings, as the first UV light 47 may couple a lower end of the outer wall 442 to an upper side of a side wall of the support cylinder 44n, and the second UV light 48 may couple lower ends of the first filter 42 and the support cylinder 44b to an upper surface of the flange 431. Details of the third UV light 49 will be described with reference to FIG. 6.

An upper filter cover 46 may cover or close opened upper ends of the first and second filter filters 42 and 44. A through hole through which the water supply pipe 25 passes may be formed in a central portion of the upper filter cover 46. The upper filter cover 46 may be coupled to the first and second filter filters 42 and 44 by an adhesive or fusing method so as to be integral with the first and second filters, or alternatively may be coupled via a known coupling means (e.g., a hook or screw method) so as to be detachable from the first and second filters 42 and 44.

Figure 6:
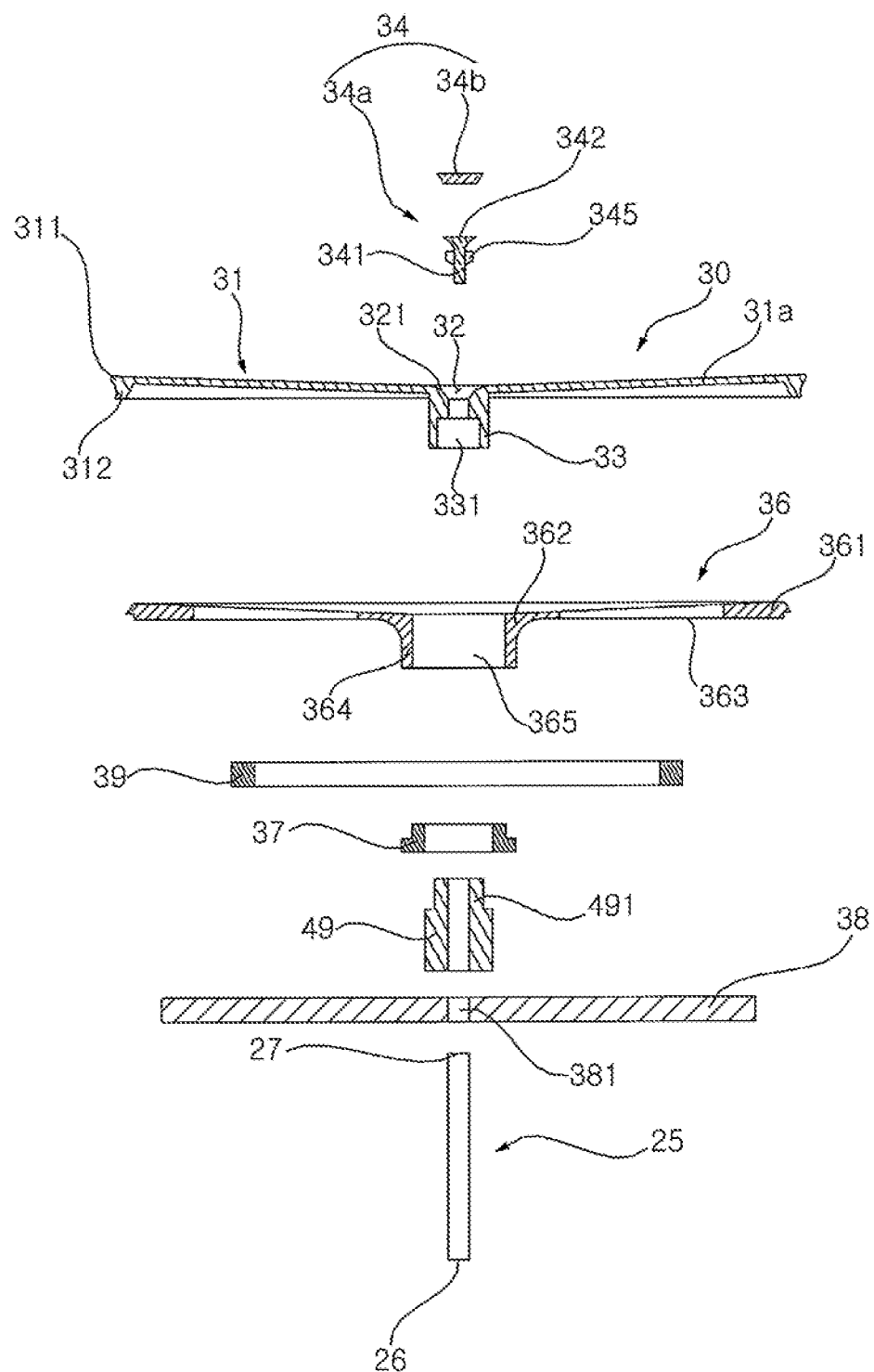
FIG. 6 is an exploded perspective view showing a water supply plate and a support plate included in an embodiment.

Referring to FIG. 6, the water supply pipe 25 may be elongated in a vertical direction, and a lower end thereof may include a water inlet 26 through which water discharged from the pump 20 flows. An upper end may include a water outlet 27 which may communicate with the water supply plate 30. The water discharged from the pump 20 may flow into the water inlet 26 to be transported to and then discharged through the water outlet 27. The discharged water may be supplied to the water supply plate 30.

Referring to FIGS. 2 and 6 to 8, the water supply plate 30 may be formed of a top plate or disc 31 having a smooth upper surface 31a A water supply hole 32 may be formed in a central portion of the top plate 31. A periphery or edge 311 of the upper plate 31 may have a convex curvature. The edge 311 of the upper plate 31 may also be referred to as a corner. Although a circular water supply plate 30 is exemplified in the figures, embodiments disclosed are not limited hereto. For example, the water supply plate 30 may have a hexagonal shape with six vertices.

A first boss 33 may protrude from a bottom surface of the top plate 31. The water supply hole 32 may formed through the first boss 33. The upper surface 31a of the top plate 31 may be formed as a smooth surface, and may be inclined upward gradually from a center near the water supply hole 32 toward the edge 311. The water supply hole 32 may include an upper portion 321 having a trumpet shape whose inner diameter gradually increases from a lower end to the upper surface 31a of the top plate 31. The upper portion 321 of the water supply hole 32 may have a wider diameter than a lower portion of the water supply hole 32.

A plug or float 34 to restrict upward movement of water discharged from the water supply hole 32 may be provided to be inserted into the water supply hole 32. The plug or float 34 may serve as a diverter. Water discharged from the water supply hole 32 may collide with the plug 34, and may be refracted in a horizontal direction and sprayed along the upper surface 31a of the top plate 31, resembling a water film. A lower end or stem 341 of the plug 34 may be inserted into the water supply hole 32. A ring-shaped gap may be formed between an upper end of head 342 of the plug 34 and an inner surface of the upper portion 321, and water may be discharged through the gap.

The plug 34 may include a body 34a and a head cover 34b, which may be formed separately and later coupled, or alternatively may be manufactured as a single element. The body 34a may include the stem 341 and the head 342. The stem 341 may extend vertically, and the head 342 may extend outward along a longitudinal direction. A plurality of retaining pieces or ribs 345 may protrude from an outer circumferential surface of the stem 341. The ribs 345 may be circumferentially spaced apart from each other. The plug 34 may be pressed-fit into the water supply hole 32, and the ribs 345 may fix a position of the plug 34 within the water supply hole 32. Alternatively, the ribs 345 may be captured within the water supply hole 32. The water supply hole 32 may include grooves to allow the ribs 345 to move up and down based on water being pumped when the plug 34 serves as a float.

The plug 34 may be configured to prevent water from rising too high above the water supply plate 30, and may further encourage water discharged from the water supply hole 32 to spread in a ring or fountain shape. Alternatively, the plug 34 may be a float which moves up and down based on water flowing out of the water outlet 27 of the water supply pipe 25, and the float may completely close the water supply hole 32 when the pump 20 is turned off.

The lower end of the stem 341 may be inserted into the water outlet 27 of the water supply pipe 25, or alternatively may be inserted into an upper end 491 of the third UV light 49 described later. An outer diameter of a lower end of the stem 341 may be smaller than an inner diameter of the water supply pipe 25, and thus a flow path may be formed between the lower end of the stem 341 and an inner peripheral surface of the water supply pipe 25. Water flowing between the stem 341 and the upper portion 321 of the water supply hole 32 may be divided into a plurality of bifurcations or spouts by the plurality of ribs 345, and as the water pressure rises, water may collide with the head 342 and the head cover 34b at a higher speed.

The head cover 34b may be provided at a top of the stem 341. The head cover 34b may have a larger diameter than a diameter of the top of the stem 341. The water discharged from the water supply hole 32 may be deflected transversely along a bottom surface of the head cover 34b.

The plug 34 may be fixed in such a manner that the ribs 345 may be forced into the water supply hole 32. Outer ends of the ribs 345 may contact an inner surface of the water supply hole 32, and a flow path may be formed between the inner surface and the ribs 345. Water discharged from the water outlet 27 of the water supply pipe 25 may be sprayed through a ring-shaped flow path between the head 342 and the upper portion 321 of the water supply hole 32. Water may then be deflected laterally (radially outward) by the head 342 and head cover 34b to form a stream or film of water radially diffusing from a center of the top plate 31 to the edge 311. The film of water may cover the upper surface 31a of the top plate 31. When water reaches the edge 311 of the upper plate 31, the water may fall or cascade into the water guide 50.

The water supply plate 30 may be made of a smooth material. As an example, the water supply plate 30 may be made of a metal material such as stainless steel or a transparent or semi-transparent synthetic resin. However, embodiments disclosed herein are not limited thereto, and the water supply plate 30 may be made of plastic and/or coated in a ceramic material.

A plate support 36 to support the water supply plate 30 may be provided on a lower side of the top plate 31. The plate support 36 may be supported by a light support or base 62 and/or a light guide plate or support 63 of an illumination assembly 60 described later with reference to FIGS. 6 and 7 after describing the rest of the water supply plate 30.

The plate support 36 may include an outer ring 361 in contact with a bottom surface of the top plate 31 and an edge protrusion 312 that protrudes downward from the edge 311 of the top plate 31. A hub or inner ring 362 may be located in a center of the plate support 36, and a plurality of spokes 363 may connect the outer ring 361 and the hub ring 362. A second boss 364 may be formed to protrude from a bottom surface of the hub ring 362. The hub ring 362 may be formed with a hole 365 formed through the second boss 364.

The first boss 33 of the top plate 31 may be inserted into the hole 365 of the hub ring 362. A sealing ring 37 may be interposed between the first and second bosses 33 and 364. An outer circumferential surface of the sealing ring 37 may be brought into close contact with an inner circumferential surface of the second boss 364 and an outer circumferential surface of the first boss 33. The sealing ring 37, which may be an elastic body or member formed of an elastic material (e.g., rubber), may connect the water supply plate 30 and the plate support 36. The sealing ring 37 may also be referred to as a packing ring. The water supply plate 30 may be detachably seated on the plate support 36.

A partition plate 38 may be provided below and spaced apart from the plate support 36. The partition plate 38 may be formed in a plate shape having a through hole 381 at its central portion through which the water supply pipe 25 may be inserted. There may be a sealed space formed between the top plate 31 and the partition plate 38, and sides of the sealed space may be defined by an illumination assembly 60 described later.

The third UV light 49 may be provided under the top plate 31 to sterilize water passing through or discharged from the water outlet 27. The third UV light source 49 may have a cylindrical shape elongated in a vertical direction, and can be fitted around the water supply pipe 25.

The upper end 491 of the third UV light 49 may be inserted into the first boss 33 of the water supply plate 30. A lower end of the third UV light 49 may be provided on the upper surface of the partition plate 38. Alternatively, the third UV light 49 may surround an upper portion of the water supply pipe 25, but may not reach partition plate 38 and instead be secured (e.g., adhered or bonded) to an outer circumferential surface of the water supply pipe 25.

The upper end 491 of the third UV light 49 may be provided so that a top of the upper end 491 may be at a position higher than a top of the water outlet 27 of the water supply pipe 25. When the upper end 491 of the third UV light 49 extends past the water outlet 27, the water discharged from the water outlet 27 may be directly irradiated with ultraviolet rays, improving sterilization.

A reinforcing ring 39 may be provided on a bottom surface of the plate support 36. The reinforcing ring 39 may be supported by reinforcing ribs 621 of the light support 62.

Figure 7:
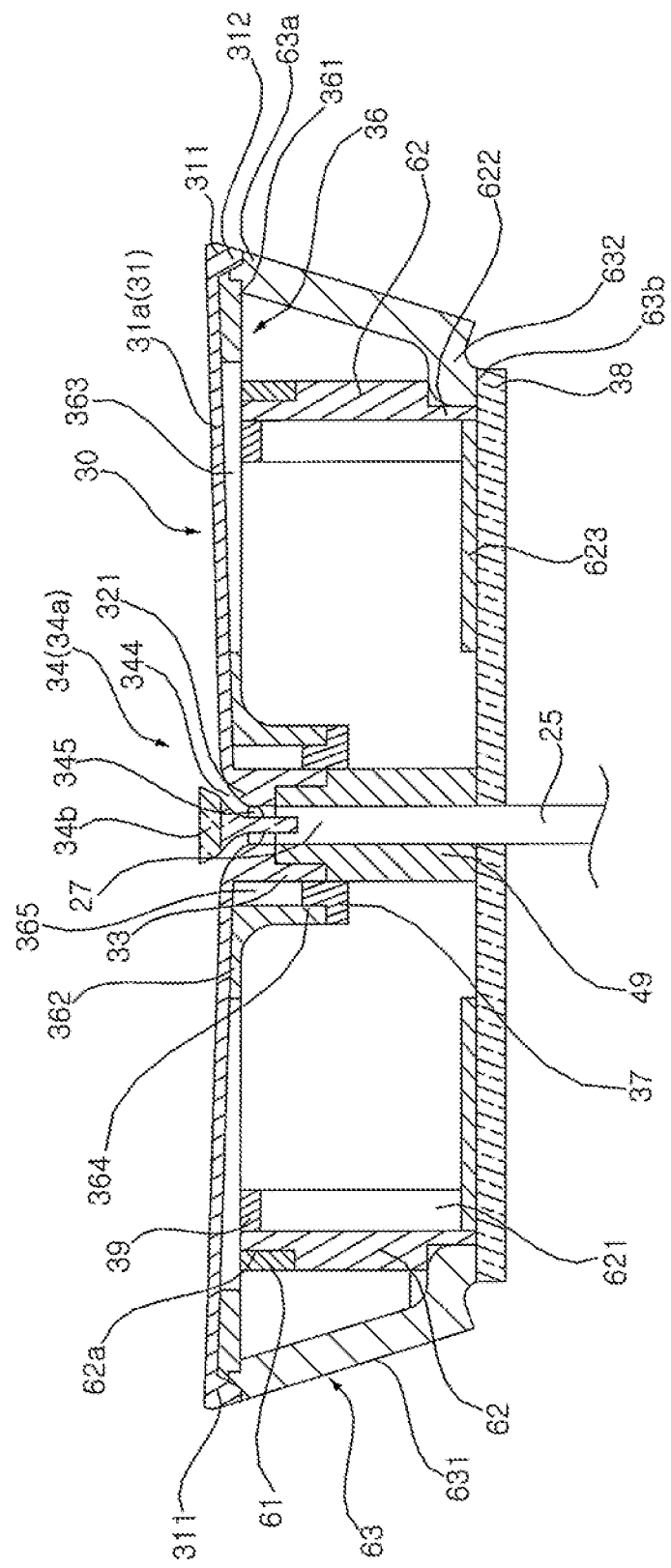
FIG. 7 is a cross-sectional view illustrating a combination of the components shown in FIG. 6 and an illumination assembly included in the present invention.
Figure 8:
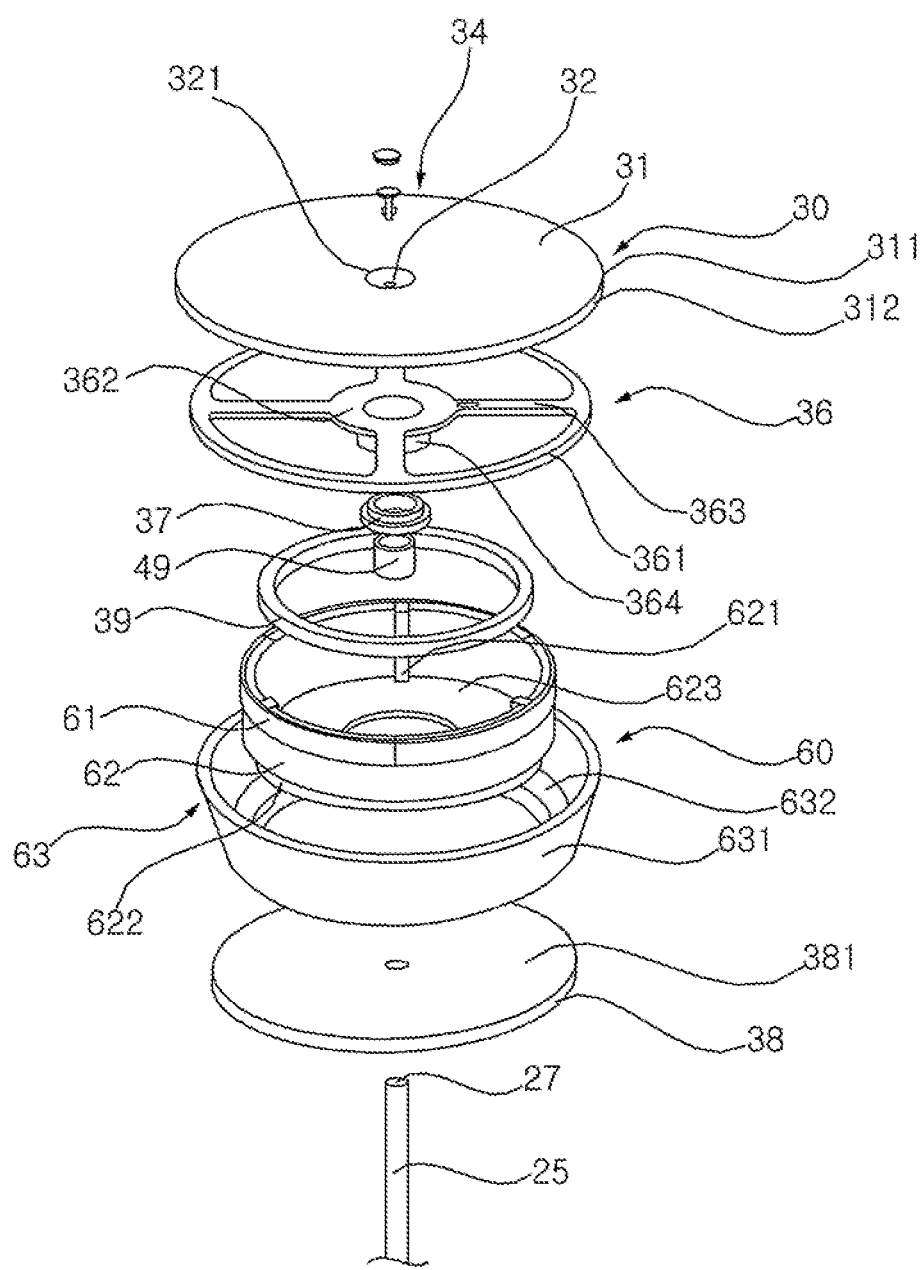
FIG. 8 is an exploded perspective view of FIG. 7.

Referring to FIGS. 2, 7, and 8, an illumination assembly 60 may be provided under the plate support 36. The illumination assembly 60 may include at least one light emitting device or light device 61, a light support or base 62 on which the light device 61 is installed, and a support 63 provided around the light base 62. The support 63 may serve as a light diffuser and may also be referred to as a light guide or light guide plate.

The light base 62 may be formed in a cylindrical shape. The support 63 may be formed as a trumpet-shaped or truncated cone-shaped inclined outward toward an upper end 63a. The upper end 63a of the support 63 may include a protrusion that may be wedged between the edge protrusion 312 of the top plate 31 and the outer ring 361 of the plate support 36. A lower end 63b of the support 63 may be provided on the partition plate 38.

An outer surface 631 of the support 63 may form an inclined surface that inclines inward the upper end 63a to the lower end 63b so that water dropped from the edge 311 of the top plate 31 does not hit collide with the support 63. The upper surface 31a of the top plate 31 and the outer surface 631 of the support 63 may form an acute angle, and so water vertically falling from the edge 311 and having a faster speed may not flow down the outer surface 631. However, when a pumping capacity or rate of the pump 20 is slowed down, water may drip down off the edge 311 onto the outer surface 631.

The light device 61 may include a plurality of light emitting diodes (LEDs) or organic light emitting diodes (OLEDS) and attached to the light base 62. The light device 61 may include a plurality of LEDs to form a ring-shape or alternatively to form an array of predetermined shapes. The light device 61 may be inserted and fixed in a concave portion 62a formed on an outer peripheral surface of an upper side of the light base 62. A shape of the concave portion 62a may correspond to a shape of the light device 61 (e.g., a ring shape).

At least one reinforcing rib 621 to support the reinforcing ring 39 may be formed on an inner circumferential surface of the light base 62. A concave portion 622 may be formed on the outer circumferential surface of a lower side of the light base 62, and an inward protrusion 632 may be formed on the lower end 63b of the support 63 and inserted into the concave portion 622. The inward protrusion 632 may project inward toward an inside of the illumination assembly 60. An inner end of the inward protrusion 632 may extend downward to be on the partition plate 38, and an outer end of the inward protrusion 632 may be engaged with an upper side of a guide 54 and/or a groove 541 of the water guide 50 described later with reference to FIG. 9.

A printed circuit board (PCB) 623 to control light emission of the light device 61 may be provided on the partition plate 38 and may contact an inner circumferential surface of the lower side of the light base 62. The light base 62, the support 63, and the partition plate 38 may be joined together (e.g., fused, adhered, or bonded) so as to be integral with each other and to form a sealed space in which the PCB 623 and LEDs of the light device 61 may remain dry. Wires connecting the PCB 623 and the light device 61 may be hidden inside of the reinforcing ribs 621, which may further protect wiring from water.

Figure 9:
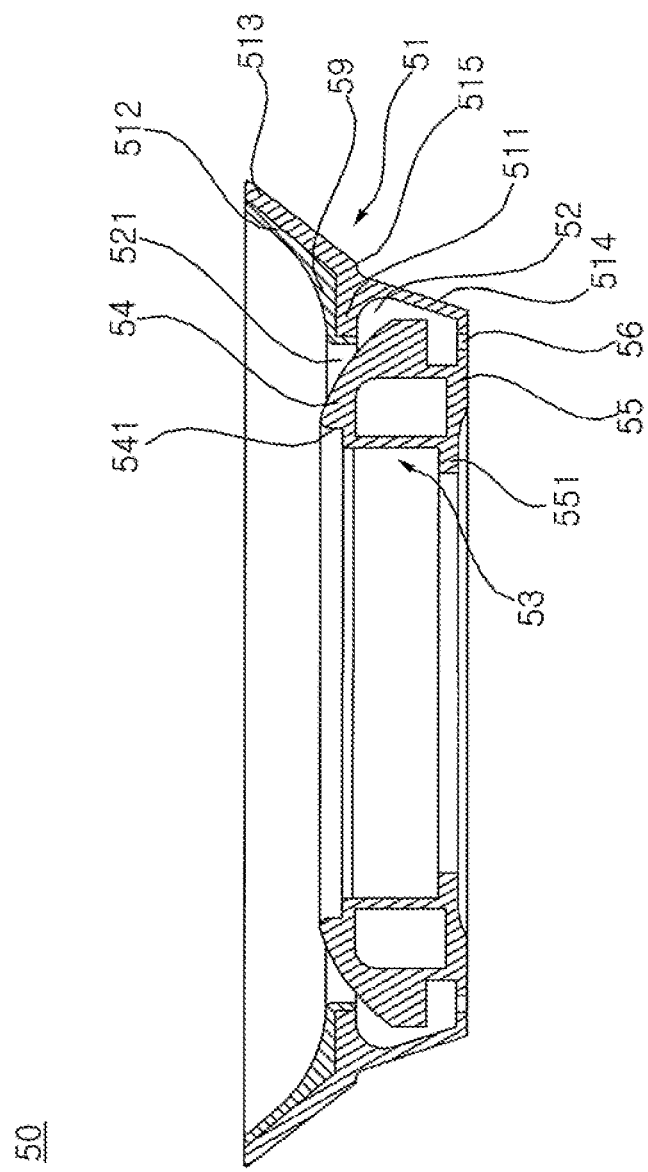
FIG. 9 is a cross-sectional view of a water guide included in an embodiment.

Referring to FIGS. 1, 2, and 9, the water guide 50 may receive water dropped from the water supply plate 30 and guide the water back to the water tank 10. The water guide 50 may be placed on the upper opening of the water tank 10, and water dropped from the edge 311 of the water supply plate 30 may be guided to the water tank 10 via a drain passage 52 and a discharge hole 56 provided on a bottom of the water guide 50.

The water guide 50 may include an outer guide wall 51, an inner guide wall 53 radially spaced apart from the outer guide wall 51, and a bottom wall 55 connecting lower ends of the outer and inner guide walls 51 and 53. The inner and outer guide walls 53 and 51 may be formed integrally with each other, or alternatively the inner guide wall 53 may be detachably coupled to the outer guide wall 51.

The outer and inner guide walls 51 and 53 may each be annular. Since the bottom wall 55 connects the lower ends of the inner and outer guide walls 51 and 53, the bottom wall 55 may also have an annular shape. A plurality of the discharge holes 56 may be formed in a circumferential direction of the bottom wall 55, and may have holes or arc-shapes. The bottom wall 55 having a plurality of discharge holes 56 may serve as an additional filter.

A drain passage 52 may be formed between the outer and inner guide walls 51 and 53. Water dropped from the edge 311 of the top plate 31 of the water supply plate 30 may be guided downward by an inner circumferential surface of the outer wall 51 or a guide 54 of the inner wall 53 to reach the drain passage 52. The drain passage 52 may extend to the bottom wall 55 so that water guided along the drain passage 52 may enter the water tank 10 through the discharge hole 56.

The outer guide wall 51 may include an upper wall or upper inclined surface 513 on which the water from the water supply plate 30 falls. The upper inclined surface 513 may be inclined outward from a lower end to an upper end to serve as a splash guard and prevent water from spilling outside of the pet water dispenser. A lower wall or lower inclined surface 514 may extend downward from the lower end of the upper inclined surface 513 and connect to the bottom wall 55. An inner surface or side 512 of the upper inclined surface 513 may have an inclination which progresses inward from the upper end to the lower end, and water dropped on the inner surface 512 of the upper inclined surface 513 may be guided to the inner wall 53.

The inner wall 53 may be provided with a guide 54, which may be a curved or rounded surface provided at a position that corresponds to where water may fall off the upper inclined surface 513. An upper surface of the guide 54 may be inclined or curved downward in a direction opposite (i.e., outward from a top end to a bottom end) to an inclination of the upper inclined surface 513. The upper surface of the guide 54 may be rounded or tilted outward from the upper end to the lower end, and may have a convex curvature.

The upper end of the guide 54 may be in contact with the lower end 63b of the support 63. A groove 541 may be formed in the upper end of the guide 54 so that an edge of the partition plate 38 may be positioned in the groove 541. An outer portion of the protruding portion 632 of the support 63 may be placed or rest on an upper end of the guide 54, an inner portion of the protruding portion 632 may be placed on the partition plate 38, and the partition plate 38 may be placed in the groove 541.

The support 63, the water guide 50, and the partition plate 38 may be assembled to be detachable from each other by a known method (e.g., screws or bolts), or may be more permanently coupled to each other via welding, adhesion, or fusion. When the water guide 50 is assembled to be detachable, the water guide 50 may be replaced with a water guide having a different shape or height.

The water guide 50 may include a protrusion 511 protruding from an inner surface of the outer guide wall 51 toward the guide 54. The inner surface 512 of the upper inclined surface 513 may be inclined outward from the protrusion 511 toward the upper end of the upper inclined surface 513. The drain passage 52 may include a narrowing portion 521 that is narrowed between the protrusion 511 and the guide 54.

A width of a flow path of the drain passage 52 in the narrow portion 521 may depend on a length of the protrusion 511. The narrow portion 521 may additionally filter water. Water dropped from the edge 311 of the top plate 31 into the water guide 50 may temporarily rest on the guide 54 at a position corresponding to the narrow portion 521 before being guided downward along the guide 54 to the discharge hole 56.

A horizontal or lateral distance or gap g (FIG. 2) may be formed between an inner end of the protrusion 511 and an edge 311 of the top plate 31. If a flow rate in a horizontal direction of the water dropped from the edge 311 is weak, the dropped water may pass directly through the drain passage 52 without contacting the inner surface 512 of the upper inclined surface 513.

When the horizontal flow rate of the dropped water is relatively high, water may flow onto the inner surface 513 of the upper inclined surface 513 and then be guided to the guide 54 before falling down to the discharge hole 56. At least a portion of the guide 54 may be located below the upper inclined surface 513.

The inner surface 512 may be coated with a coating or covering layer 59 of a material different from the guide 50 so as to improve the feel of the aesthetics, to soften the touch, and to prevent the falling water from being scattered. The coating layer 59 may be coated on the inner surface 512 of the upper inclined surface 513, and may also be coated on an upper surface of the protrusion 511.

The outer guide wall 51 may be formed to be higher than the inner guide wall 53. The outer guide wall 51 may also be formed to be higher than the upper wall 11a of the water tank 10 and may be extend outward beyond the upper wall 11a. An inclination of the outer guide wall 51 may be in a direction opposite to an inclination of the upper wall 11a, or alternatively, when the upper wall 11a is inclined outward from the lower end to the upper end, may be less steep than an inclination of the upper wall 11a. A predetermined angle Θ may be formed between an outer surface 513a of the upper inclined surface 513 and an outer surface of the extension 114 of the upper wall 11a. The predetermined angle Θ may be an obtuse angle, (e.g., 120°).

The upper and lower inclined surfaces 513 may be stepped relative to each other. A step portion 515 may be formed between the upper and lower inclined surfaces 513 on an outer surface of the outer guide wall 51. The protrusion 511 may be formed at a position corresponding to the step portion 515 between the upper and lower inclined surfaces 513 and 514.

Inclinations of the upper and lower inclined surfaces 513 and 514 may differ. As an example, an inclination of the upper inclined surface 513 may be shallower than an inclination of the lower inclined surface 514.

The step portion 515 may be mounted on the first protruding plate 111 formed on the upper wall 11a when the water guide 50 is inserted onto the water tank 10. The step portion 515 may be caught by the first protruding plate 111 and prevent the water guide 50 from falling downward. An inclination of the inner tank wall 113 may correspond to an inclination of the lower inclined surface 514 to further support the water guide 50.

The upper inclined surface 513 of the water guide 50 may be supported by and contact with the bumper 115 attached on the upper wall 11a. The bumper 115 may be made of an absorbent material such as rubber, silicone, or fiber to absorb vibrations and noise generated during an operation of the pump 20 and propagating through water guide 50 and the water tank 10, which may reduce noise and provide stability.

The water guide 50 may further include a perforated protrusion or extension 551 protruding radially inward from an inner circumferential surface of the inner wall 53. The extension 551 may be a raised extension from the bottom wall 55, and may be provided to be higher than the discharge hole 56. The extension 551 may be positioned above an edge of the upper filter cover 46. A curvature of a bottom surface of the inner wall 53 may correspond to a curvature of an upper surface and edge of the upper filter cover 46.

A sealed space or chamber S may be formed between the upper filter cover 46, the inner guide wall 53 of the water guide 50, and the partition plate 38. The partition plate 38 may define a top of the space S, the upper filter cover 46 may define a bottom of the space S, and an inner surface of the inner guide wall 53 may form a side of the space S. Couplings of the upper filter cover 45, the inner guide wall 53, and the partition plate 38 may be configured so that an airtightness is maintained and so that water cannot penetrate or leak into the space S. An auxiliary or secondary battery B and the first controller C1 may be installed in the space S. The extension 551 and the upper filter cover 46 may be assembled to be detachable from each other (e.g., by an arm, a hook, or a screw method), or may be more permanently fixed by fusion, adhesion, or welding.

Figure 10:
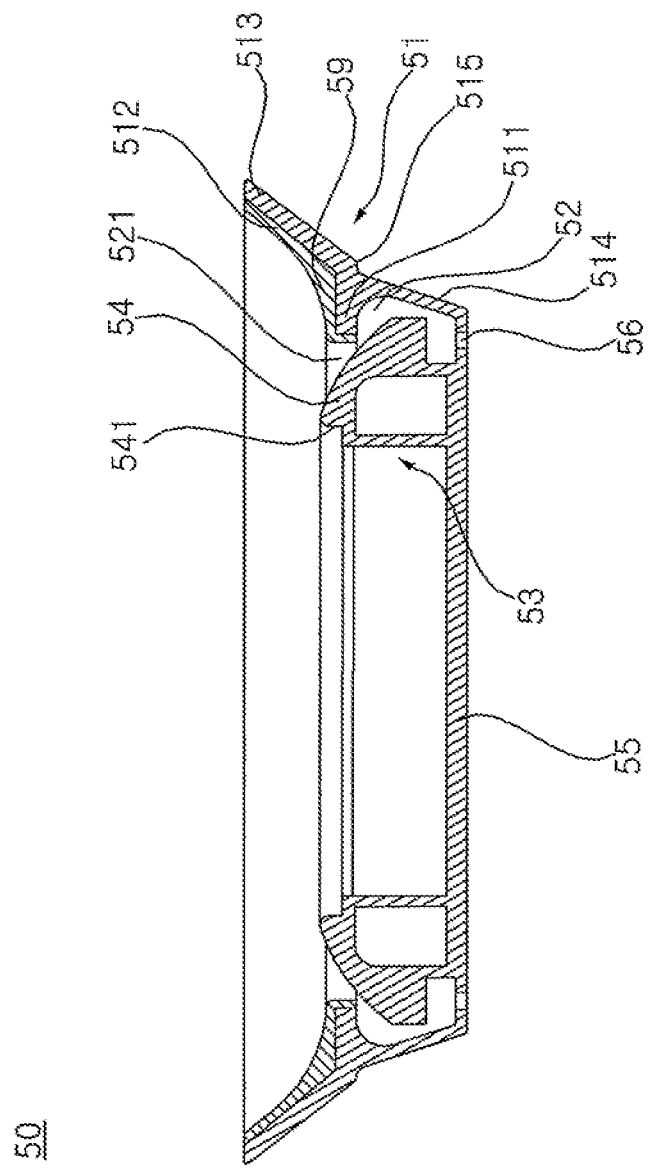
FIG. 10 is a cross-sectional view of a water guide according to another embodiment.

Another embodiment of the water guide is shown in FIG. 10 as a water guide 50'. The water guide 50' shown in FIG. 10 may differ from the water guide 50 of FIG. 9 in that a bottom wall 55' covers an entire lower side or opening of the water guide 50'. The other structures may be the same as that of the embodiment of FIG. 9 described above. In such an alternative embodiment, the upper filter cover 46 may be omitted, and the bottom wall 55' may couple to the upper ends of the first and second filters 42 and 44.

In either embodiment (FIG. 9 or FIG. 10), referring back to FIG. 2, the filter assembly 40, the pump 20, the water supply pipe 25, the water supply plate 30, the illumination assembly 60, and the water guide 50 (or 50') may be combined or assembled together to form a single inner assembly. The inner assembly may be detachably provided in the water tank 10 to be easily lifted and separated from the water tank 10 so that and a cleaning of the water tank 10 and a reparation of various components (e.g., the pump 20) can be easily performed. The user may remove the inner assembly from the water tank 10 by lifting the water guide 50 from the outer guide wall 51.

The water supply plate 30 may be configured to be removable from the inner assembly. The water supply plate 30 may be lifted up and removed to be cleaned, repaired, or swapped with another water supply plate 30 having a different height, shape, angle of inclination, material, etc.

When the inner assembly is provided in the water tank 10, the outer guide wall 51 may be positioned at an upper edge of the inner assembly and may be hooked on the upper wall 11a of the water tank 10 via the step portion 515. The lower filter cover 43 may be positioned at a lower center of the inner assembly and cover the protrusion 121 formed on the bottom plate 12 of the water tank 10. The inner assembly may be stably installed in the water tank 10 at a predetermined position without being moved laterally or horizontally in the water tank 10.

Figure 11:
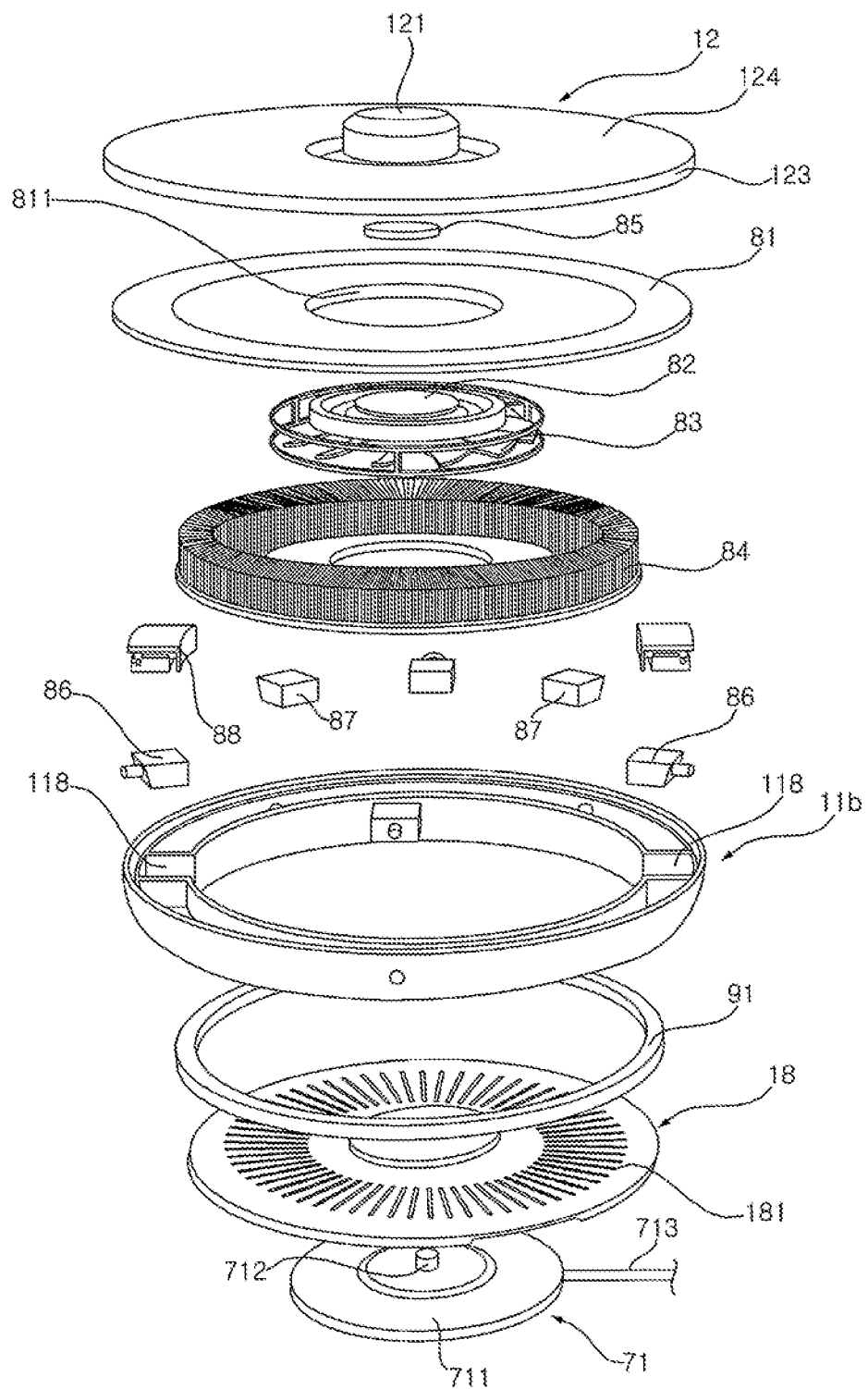
FIG. 11 is an exploded perspective view illustrating various components installed on a bottom side of the bottom plate of the water tank according to an embodiment.

Referring to FIGS. 2 and 11, a power supply device or assembly may include a docking station 71 having a weight or body 711 having a sufficient weight for balancing, a first terminal provided in a protrusion 712, and a wire 713 to apply external power (e.g., from a socket) to the first terminal.

A circular groove or cavity 19 (FIG. 2) may be formed on a bottom surface of the base plate 18. The cavity 19 may be inserted onto the protruding rod 712 of the weight 711. A second terminal may be provided inside the cavity 19 to electrically connect to the first terminal of the protruding rod 712. Details of the first and second terminals are provided in U.S. application Ser. No. 16/571,089 filed on Sep. 14, 2019, the entire contents of which are incorporated by reference herein.

The base plate 18 can be rotatably mounted on the weight 711. The cavity 19 may be rotatably inserted onto the protruding rod 712 so that the first and second terminals remain electrically connected even when the water tank 10 and the docking station 71 are relatively rotated. As an example, at least one of the first and second terminals may be circular. Since the electric wire 713 may be connected to the base plate 18, even when the water tank 10 is rotated, power supply may be maintained without twisting the electric wire 713.

A printed circuit board (PCB) 715 electrically connected to the second terminal may be installed in a space formed between the bottom plate 12 of the water tank 10, the base plate 18, and the container support 11b. The first wireless power transfer device 72 may be electrically connected to the PCB 715 and wirelessly connected to the second wireless power transfer device 73 in the inner assembly. The first wireless power transfer device 72 may be provided in the inner space of the protrusion 121 below the bottom plate 12, while the second wireless power transfer device 73 may be provided above the lower filter cover 43 in the inner assembly so that power may be wireless transferred from an external power supply to electronic devices inside the inner assembly, such as the pump 20 or the light device 61.

When the inner assembly is installed in the water tank 10 (i.e., the lower filter cover 43 covers the protrusion 121 of the bottom plate 12), the second wireless power transfer device 73 may receive and transmit wireless power to the first wireless power transfer device 72. The first and second wireless power transfer devices 72 and 73 may be placed at positions to receive wireless power from an antenna and generate inductive power. A wireless power transfer (WPT) process is described in more detail in U.S. application Ser. No. 16/571,075 filed on Sep. 14, 2019, the entire contents of which are incorporated by reference herein.

Referring to FIGS. 3 and 11, a thermoelectric element 81 to maintain a temperature of the water in the water tank 10 at a predetermined temperature may be provided below the bottom plate 12 of the water tank 10 in the inner space of the container support 11b. The thermoelectric element 81 may be a thermoelectric cooler (TEC) or a Peltier device. A motor 82 may be installed in a hollow portion or hole 811 of the thermoelectric element 81, and a heat radiating fan 83 operated by the motor 82 may be provided below the motor 82. A heat sink 84 having a heat dissipation plate and plurality of heat radiating fins may be installed to surround the fan 83.

A water temperature sensor 85 may be installed in a space in the inner space of the protrusion 121 of the bottom plate 12. The water temperature sensor 85 may include an optional probe that is inserted through the bottom plate 12 to contact the water in the water tank 10 directly. When the optional probe is omitted, the water temperature sensor 85 may be configured to accurately measure a temperature of the water in the water tank 10 because it may have a large surface area and contact a lower surface of an upper end of the protrusion 121, which may be made of metal. The bottom plate 12 may be made of a material having a high thermal conductivity, such as metal (e.g., stainless steel).

When a temperature of the water in the water tank 10 sensed by the water temperature sensor 85 is not within a predetermined or preset temperature range, the thermoelectric element 81 may be operated to cool or heat the water. Heat of the thermoelectric element 81 may be dissipated via the heat sink 84, and hot air (or alternatively, cold air in a heating mode) may be exhausted via an outer edge of at least one vent 181 formed in the base plate 18. Alternatively or in addition thereto, there may be at least one exhaust vent formed on a lower side or the edge 117 of the container support 11b. Since the water temperature sensor 85 may have a large contact area with the water stored in the water tank 10 and is installed inside the protrusion 121 of the bottom plate 12 over which the water moves toward the pump 20, the water temperature sensor 85 may accurately detect the temperature of water in the water tank 10.

When a temperature of the thermoelectric element 81 (or alternatively, the heat sink 84) sensed by a thermoelectric element temperature sensor 81a (FIG. 12) is higher than a predetermined thermoelectric temperature range, the motor 82 may be operated and the fan 83 can be rotated. When the fan 83 is rotated, external air flows into the heat sink 84 and then is discharged through a ventilation hole 181 formed in the base plate 18. The heat sink 84 and the thermoelectric element 81 may be cooled.

Although not shown, an angle adjusting unit to adjust an inclination angle of the water supply plate 30 may be provided so that an inclination of the water tank 10 sensed by a gyro sensor 88 (see FIG. 12) may be adjusted. The water supply plate 30 may be provided on an adjustable support (e.g., the support 63 may have legs having adjustable heights), or the docking station 71 may be provided on a pedestal having adjustable legs. The inclination angle of the water supply plate 30 can be adjusted to be horizontally arranged.

A proximity sensor 87 may be provided in the mounting portion 118 to sense when a pet approaches the pet water dispenser. The proximity sensor 87 may be a radar sensor or laser sensor, and may be aligned with an optional hole or membrane formed in the outer circumferential surface 117 of the container support 11b.

Hereinafter, a function of the first controller C1 according to an embodiment will be described with reference to FIG. 12. The first controller C1 may receive a signal sensed by the water level sensor 86 and calculate a water level value. When the calculated water level value is lower than a predetermined or preset water level value, the first controller C1 may activate or turn on the warning light 91 to alert a user to refill or replace water in the water tank 10, and may stop an operation of the pump 20.

The proximity sensor 87 may sense a pet approaching the pet water dispenser. If the first controller C1 determines, based on a signal received from the proximity sensor 87 and/or a sensed position of the pet by the proximity sensor 87, that a pet or an animal has approached the pet water dispenser within a predetermined distance range, the pump 20 may be operated. When it is sensed that a pet is no longer within the predetermined distance range, an operation of the pump 20 may be stopped. Alternatively, the first controller C1 may control the pump 20 to be operated only when a pet positioned, within the predetermined distance range continues to approach the pet water dispenser by a predetermined distance or speed or more.

There may be a plurality of proximity sensors 87 spaced apart in a circumferential direction around the container support 11b. When the first controller C1 determines that a plurality of pets are approaching by receiving multiple signals from the plurality of proximity sensors 87, a pumping capacity or rate of the pump 20 may be increased so as to correspond to a number of approaching pets and so that a sufficient water supply can be provided.

Further, an operation time of the pump 20 according to a signal of the proximity sensor 87 may be continuously stored and analyzed, and a water supply time or time period may be periodically stored and predicted, and the pump 20 may be operated at predicted times. For example, the controller C1 may predict that a pet will approach the pet water dispenser every hour, or everyday at noon, and accordingly may operate the pump 20 every hour or everyday at noon.

Figure 12:
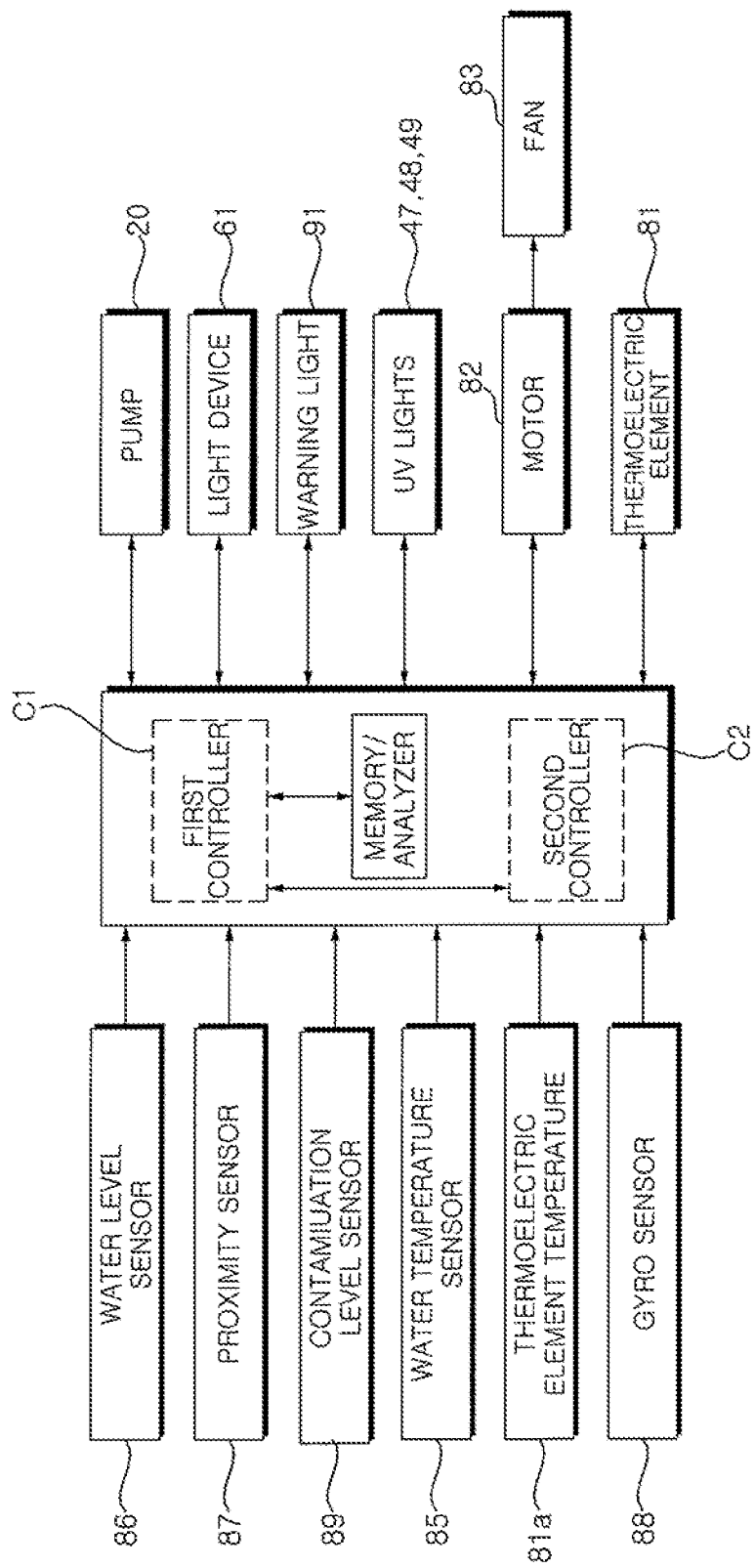
FIG. 12 is a block diagram showing a controller according to an embodiment.

The pet water dispenser may also include a contamination level sensor 89 (FIG. 12). If the first controller C1 determines that a contamination degree of the water stored in the water tank 10 is equal to or higher than a predetermined contamination value, the controller C1 may operate the first, second, and third UV lights 47, 48, and 49, stop an operation of the pump 20, operate the warning light 91, and/or control a warning speaker (not shown) to sound a warning alarm.

When the first controller C1 and/or a second controller C2 determines, via a signal from the water temperature sensor 85, that a temperature of the water stored in the water tank 10 is equal to or higher than a first predetermined temperature, the thermoelectric element 81 and the fan 83 may be controlled (via a second controller C2) to be operated to cool the water. If the first controller C1 and/or the second controller C2 determines that a temperature of the water stored in the water tank 10 is less than or equal to a second predetermined temperature, the thermoelectric element 81 and the fan 83 may be operated to heat the water.

When the first and/or second controller C1 and/or C2 determines, via the thermoelectric element temperature sensor 81a, that a temperature of the thermoelectric element 81 is a predetermined thermoelectric temperature value or more, the motor 82 may be operated to rotate the fan 83, which may help to cool the thermoelectric element 81 so in conjunction with the heat sink 84.

When the first and/or second controller C1 and/or C2 determines, via a signal from the gyro sensor 88, that a tilt or inclination of the water tank 10 is equal to or greater than a predetermined inclination value, an angle adjusting unit or inclination adjuster (not shown) provided below the water tank 10 may be operated to rotate the water supply plate 30 and/or the water tank 10.

The first controller C1 may control the pump 20, the light device 61, and the first, second, and third UV lights 47, 48, and 49, and may be provided in the sealed space S of the inner assembly. A second controller C2 to control the thermoelectric element 81, the motor 82, and the warning light 91 may be provided separately from the first controller C1. The second controller C2 may be installed below the bottom plate 12. The first and second controllers C1 and C2 may each have communication modules to communicate data and determinations with each other.

This application is related to U.S. application Ser. No. 16/571,245 filed on Sep. 16, 2019, U.S. application Ser. No. 16/571,093 filed on Sep. 14, 2019, U.S. application Ser. No. 16/571,089 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920 filed on May 24, 2019; and 10-2019-0080603 and 10-2019-0080604 filed on Jul. 4, 2019.

Embodiments disclosed herein may provide a pet water dispenser in which noise caused by dripping is reduced while allowing an animal or pet to drink water falling from a water supply plate. The pet water dispenser may be capable of reducing the influence of noise on an outside of the water tank or the surrounding environment even when a drop level or drop speed increases due to a decrease in a water level in the water tank. The pet water dispenser may be capable of maintaining a quiet environment even when water is circulated by operating a pump for a long time or periodically for water quality management. A depth of the water tank may be deeply formed to enlarge a capacity of a water tank, and a deviation of a falling water noise emitted to an outside may be relatively small even if a disparity deviation according to a water level becomes large.

The pet water dispenser may be capable of preventing water in the water tank from being contaminated by food or body fluids shed by the pet and maintaining water cleanliness. Even if a height of the water supply plate is changed, a dropping noise when water is finally dropped into the water tank may be kept constant so that the falling water can be controlled within an appropriate range. The pet water dispenser may reduce noise from an operation sound of the pump that is transmitted to the outside of the water tank.

The present disclosure may solve all the problems that may be caused or predicted from the pet water dispenser according to the related art, in addition to the technical problems described above. The problems solved by embodiments disclosed herein are not limited to the above-mentioned problems, and other problems not mentioned may be clearly understood to be solved by those skilled in the art from the following description.

The pet water dispenser of the present disclosure may include a water tank where water is pumped by a pump and reaches a water supply plate communicating with a water supply pipe so that a pet or an animal may drink water on the water supply plate or water falling from the water supply plate according to its taste. A water guide to receive the water dropped from the water supply plate may be included. The water tank may be provided with an opening on the upper surface (or in the form of an upwardly opened container), so that at least a part of the opening is covered by the water guide. The water guide may shield a substantial part of the opening to prevent contamination of the water in the water tank. Since the opened upper surface of the water tank is closed by the water guide, the pet cannot swirl the water in the water tank with his or her feet.

The water guide may discharge or guide the water dropped from the water supply plate into the water tank, and a discharge hole for water discharge is formed in the water guide. Water dropped from the water supply plate into the water guide may be guided and/or discharged into the water tank through the discharge hole. Here, the water guide may be to temporarily store (or slow) water until a discharge of the water through the discharge hole is completed.

The discharge hole is located below the opening of the upper surface of the water tank. At least a part of the water guide may be provided inside of the water tank through the opening, and the discharge hole may be formed in this part. Since the discharge hole is located in a region surrounded by the upper end of the water tank, the degree to which noise generated when water falls through the discharge hole and collides with the water surface in the water tank leaks to the outside of the water tank may be significantly reduced.

The water tank may include a wall whose top defines the opening, and the water guide may include an outer wall or outer guide wall supported by the wall. The water guide may cover the open upper surface of the water tank while being supported by the outer wall, and the discharge hole may be located below the upper end of the outer wall. An upper end of the wall defining the opening of the water tank may contact the outer wall of the water guide so that leakage and/or a dripping noise into a gap between the water guide and the opening of the water tank is reduced.

The water guide may further include a bottom wall extending radially inwardly from a lower end of the outer wall, and the discharge hole may be formed in the bottom wall. Since the bottom wall is located in the water tank, the discharge hole may be located in a region surrounded by the wall of the water tank.

The water guide may further include an inner wall or inner guide wall spaced radially inwardly from the outer wall and forming a drain passage between the outer wall and the inner wall. The inner wall may be connected to the outer wall by the bottom wall.

The outer wall may be inclined downwardly inward along the radial direction. A height of a guide of the inner wall may be less than a height of the outer wall. When water flows down from the water supply plate, when the flow rate in the horizontal direction is relatively high, the water may fall down to the outer wall, flow radially inward along the outer wall, and then reach the inner wall.

The inner wall may further include a guide whose surface to which the water dropped from the outer wall is inclined downward radially outward. When water flows down from the water supply plate, the water may flow downward to the inner wall and flow radially outward along the guide when the flow rate in the horizontal direction is relatively low. The inner wall may be removably coupled to the outer wall.

The upper end of the outer wall may be located above the upper end of the wall and may surround the water supply plate when viewed from above. The top of the outer wall may be located radially outwardly of the top of the wall when viewed from above.

The water tank may further include a bottom plate defining a bottom of a space in which water is stored, and a rim wall or container support on which the bottom plate is mounted. The wall of the water tank may include a main wall extending upward from the rim wall and having an outer shape gradually decreasing toward the upper side.

The wall of the water tank may include an upper wall formed in an annular shape and located on the upper side of the main wall and having an inner inclined surface inclined downwardly inward in a radial direction on the inner side of the annular shape of the upper wall. The water guide may include an outer inclined surface supported by the inner inclined surface. The inner inclined surface and the outer inclined surface may be in contact with each other.

The upper wall may include a wall portion having a lower end portion or groove coupled with an upper end portion of the main wall, a first protrusion extending radially inward by a first length from the wall portion, and a second protrusion extending radially inward by a second length that is longer than the first length. The inner inclined surface may connect the first protrusion and the second protrusion.

The outer wall of the water guide may comprise a lower portion of an outer wall forming the outer inclined surface and a step portion extending radially outward from the upper end of the lower portion of the outer wall to be placed on the first protrusion, and an upwardly sloping outer wall upper portion.

Packing or a bumper may further be provided on the first protrusion, and the upper portion of the outer wall may be in contact with the packing. A bottom surface of the packing may be attached to the first protrusion, and the outer surface of the packing may be attached to the inner circumferential surface of the wall portion.

The water guide may further include a protrusion or extension protruding from the upper side of the outer wall towards the guide. Meanwhile, when viewed from the top, there may be a gap between the water supply plate and the protrusion or between a vertical portion of the inner wall and the protrusion.

Meanwhile, the water supply plate may include an upper or top plate that water supplied through the water supply hole flows over, and a periphery of the upper plate may have a convex closed curve (for example, a circular shape). A nozzle cap or plug may be inserted into a water supply port or hole to form a ring-shaped gap between the water supply port and the nozzle cap.

The water guide may be provided below the water supply plate and may have an outer inclined surface supported by the inner inclined surface. When the outer inclined surface is positioned on the inner inclined surface, the water guide may receive the water dropped from the water supply plate in a state in which the opening is closed and guides the water down into the water tank, and when the outer inclined surface is separated from the inner inclined surface, the opening of the water tank may be opened.

A pet water dispenser according to embodiments disclosed herein may not drop or guide water directly from the water supply plate into the water tank but may discharge or guide the water primarily dropped to a water storage or a water guide provided between the water tank and the water supply plate into the water tank through a discharge hole formed in the water guide. Even when a water level in the water tank becomes large and a dripping noise or splashing increases, a discharge hole may be located below the opening of the water tank (i.e., inside the water tank). The noise leaked through the discharge hole may be sounded again by the wall of the water tank defining the opening, and the silent state can be maintained.

Even if the pump is operated for a long period of time for water quality management, since an operation sound of the pump and a dripping noise may be dampened by the wall, the pet water dispenser may prevent noise pollution due to the pump operation. In addition, the present disclosure effectively reduces or eliminates noise as described above. Therefore, even if the water tank capacity is enlarged (i.e., the water tank is made deeper), the dropping noise may not be significantly increased compared to a water tank depth increase, and so the pet water dispenser may be (more quietly) used for large animals or several animals.

The water guide that receives the water falling from the water supply plate and discharges or guides the water from the water supply plate is provided between the water tank and the water supply plate so that the opened upper side of the water tank is shielded from an outside. Cleanliness may be predictably managed. It may be possible to always provide clean water at an appropriate temperature to the pet.

Embodiments disclosed herein may be implemented as a liquid dispenser, comprising a tank having an upper opening, a pump provided in the tank, a pipe to transfer liquid discharged from, the pump to a plate provided above the tank and having a hole communicating with the pipe, wherein the liquid supplied through the hole flows over an upper surface of the plate, and a liquid guide provided below the plate and having a discharge hole through which liquid dropped from the plate enters the tank. The liquid guide and the plate may cover the upper opening of the tank, and the discharge hole may be provided below the upper opening of the tank.

The tank may include a wall that defines a side of the tank and that supports an outer guide wall of the liquid guide. An upper end of the wall of the tank may support an outer surface of the outer guide wall.

A bottom wall may extend inward from a lower end of the outer guide wall, wherein the discharge hole may be formed in the bottom wall. An inner guide wall may be spaced apart from and provided on an inner side of the outer guide wall. A drain passage may be formed between the outer guide wall and the inner guide wall to guide liquid to the discharge hole. The bottom wall may connect the inner guide wall to the outer guide wall. A guide may be provided on an upper surface of the inner guide wall, the guide having a surface on which liquid may be dropped from the outer guide wall, wherein the guide may have a convex curvature. The outer guide wall may be detachably coupled to an upper wall of the tank. A height of the guide may be lower than a height of the outer guide wall. The plate may be located above an upper end of the outer guide wall, and a shape of a perimeter of an upper end of the outer guide wall may correspond to a shape of a perimeter of the plate. A diameter of the upper end of the outer guide wall may be larger than a diameter of the plate.

The tank may further include a bottom plate defining a bottom of a space in which liquid may be stored, and a container support on which the bottom plate may be mounted. The wall of the tank may extend upward from the container support and may have a radius that decreases from a lower end toward an upper end.

The wall of the tank may include a main wall extending from the container support and an upper wall positioned on an upper end of the main wall. An inner tank wall may be coupled to the upper wall and may have a radius that increases from a lower end to an upper end. The outer guide wall may have an outer inclined surface supported by the inner tank wall.

The inner tank wall and a portion of the outer inclined surface contacting the inner tank wall may have equal inclination. A first protruding plate may extend radially inward into the tank from the upper wall and have a first length, and a second protruding plate may extend radially inward into the tank from the upper wall and have a second length longer than the first length. The inner tank wall may connect the first protruding plate and the second protruding plate.

The outer guide wall may have an upper and lower portion. The lower portion may include the outer inclined surface supported by the inner tank wall. A step portion may be formed on an outer surface of the outer guide wall between the upper and lower portions of the outer guide wall. The step portion may be placed on an inner end of the first protruding plate. The upper portion of the outer guide wall may be inclined outward from the step portion to an upper end.

An extension may extend from the upper wall and an outer end of the first protruding plate. A bumper may be provided on the extension. The upper portion of the outer guide wall may be in contact with the bumper when the liquid guide is placed in the tank.

A bottom surface of the bumper may be provided on an upper surface of the first protruding plate. An outer surface of the bumper may be provided on an inner surface of the extension. A protrusion may protrude from the outer guide wall toward the guide at a position between the upper and lower portions of the outer guide wall. A lateral distance may be present between an edge of the plate and an inner end of the protrusion.

Liquid supplied through the hole of the plate may flow over an upper surface of the plate and fall off an edge of the plate. The edge of the plate may be curved. A plug inserted may be into the hole of the plate to form a ring-shaped space between the hole of the plate and the plug through which liquid may be discharged.

Embodiments disclosed herein may be implemented as a liquid dispenser, comprising a tank formed by a wall having an upper opening, a pump provided in the tank, a pipe to transfer liquid discharged from the pump, and a plate provided above the tank and having a hole communicating with the pipe. Liquid flowing through the pipe may flow over an upper surface of the plate. The wall of the tank may include an upper wall having an outer inclined surface provided under the plate and an inner tank wall that supports an outer guide wall of a liquid guide to receive liquid dropped from the plate. The upper opening of the tank may be closed when the outer guide wall is positioned on the inner tank wall, and the upper opening of the tank may be exposed when the outer guide wall is lifted from the inner tank wall.

Embodiments disclosed herein may be implemented as a liquid dispenser including a tank having an upper opening, a pump provided in the tank, a plate provided above the tank and having a hole, a pipe to transfer liquid discharged from the pump to the hole of the plate, and a liquid guide provided below the plate to guide liquid dropped from an edge of the plate to the tank, wherein the liquid guide and the plate cover the upper opening of the tank.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A liquid dispenser, comprising:
a tank having an upper opening;
a pump provided in the tank;
a pipe to transfer liquid discharged from the pump to a plate provided above the tank and having a hole communicating with the pipe, wherein the liquid supplied through the hole flows over an upper surface of the plate; and
a liquid guide provided below the plate and having a discharge hole through which liquid dropped from the plate enters the tank, wherein the liquid guide and the plate cover the upper opening of the tank, and the discharge hole is provided below the upper opening of the tank, wherein the tank includes a wall that defines a side of the tank and that supports an outer guide wall of the liquid guide.

2. The liquid dispenser of claim 1, wherein an upper end of the wall of the tank supports an outer surface of the outer guide wall.

3. The liquid dispenser of claim 2, further including a bottom wall extending inward from a lower end of the outer guide wall, wherein the discharge hole is formed in the bottom wall.

4. The liquid dispenser of claim 3, further including an inner guide wall spaced apart from and provided on an inner side of the outer guide wall, wherein a drain passage is formed between the outer guide wall and the inner guide wall to guide liquid to the discharge hole.

5. The liquid dispenser of claim 4, wherein the bottom wall connects the inner guide wall to the outer guide wall.

6. The liquid dispenser of claim 4, further including a guide provided on an upper surface of the inner guide wall, the guide having a surface on which liquid is dropped from the outer guide wall, wherein the guide has a convex curvature.

7. The liquid dispenser of claim 6, wherein the outer guide wall is detachably coupled to an upper wall of the tank.

8. The liquid dispenser of claim 6, wherein a height of the guide is lower than a height of the outer guide wall.

9. The liquid dispenser of claim 8, wherein the plate is located above an upper end of the outer guide wall, and a shape of a perimeter of an upper end of the outer guide wall corresponds to a shape of a perimeter of the plate.

10. The liquid dispenser of claim 9, wherein a diameter of the upper end of the outer guide wall is larger than a diameter of the plate.

11. The liquid dispenser of claim 9, wherein the tank further includes:
    a bottom plate defining a bottom of a space in which liquid is stored; and
    a container support on which the bottom plate is mounted, wherein the wall of the tank extends upward from the container support and has a radius that decreases from a lower end toward an upper end.

12. The liquid dispenser of claim 11, wherein the wall of the tank includes a main wall extending from the container support and an upper wall positioned on an upper end of the main wall, wherein an inner tank wall is coupled to the upper wall and has a radius that increases from a lower end to an upper end, and wherein the outer guide wall has an outer inclined surface supported by the inner tank wall.

13. The liquid dispenser of claim 12, wherein the inner tank wall and a portion of the outer inclined surface contacting the inner tank wall have equal inclinations.

14. The liquid dispenser of claim 12, further including
    a first protruding plate extending radially inward into the tank from the upper wall and having a first length; and
    a second protruding plate extending radially inward into the tank from the upper wall and having a second length longer than the first length, wherein the inner tank wall connects the first protruding plate and the second protruding plate.

15. The liquid dispenser of claim 14, wherein the outer guide wall has an upper and lower portion, wherein the lower portion includes the outer inclined surface supported by the inner tank wall, wherein a step portion is formed on an outer surface of the outer guide wall between the upper and lower portions of the outer guide wall, wherein the step portion is placed on an inner end of the first protruding plate, and wherein the upper portion of the outer guide wall is inclined outward from the step portion to an upper end.

16. The liquid dispenser of claim 15, further including an extension extending from the upper wall and an outer end of the first protruding plate, wherein a bumper is provided on the extension, and wherein the upper portion of the outer guide wall is in contact with the bumper when the liquid guide is placed in the tank.

17. The liquid dispenser of claim 16, wherein a bottom surface of the bumper is provided on an upper surface of the first protruding plate, and an outer surface of the bumper is provided on an inner surface of the extension.

18. The liquid dispenser of claim 15, further including a protrusion protruding from the outer guide wall toward the guide at a position between the upper and lower portions of the outer guide wall.

19. The liquid dispenser of claim 18, wherein a lateral distance is present between an edge of the plate and an inner end of the protrusion.

20. The liquid dispenser of claim 1, wherein liquid supplied through the hole of the plate flows over an upper surface of the plate and falls off an edge of the plate, wherein the edge of the plate is curved.

21. The liquid dispenser of claim 20, further comprising a plug inserted into the hole of the plate to form a ring-shaped space between the hole of the plate and the plug through which liquid is discharged.

22. A liquid dispenser, comprising:
    a tank formed by a wall having an upper opening ;
    a pump provided in the tank;
    a pipe to transfer liquid discharged from the pump;
    a plate provided above the tank and having a hole communicating with the pipe, wherein liquid flowing through the pipe flows over an upper surface of the plate, wherein the wall of the tank includes an upper wall having an outer inclined surface provided under the plate and an inner tank wall that supports an outer guide wall of a liquid guide to receive liquid dropped from the plate, and wherein the upper opening of the tank is closed when the outer guide wall is positioned on the inner tank wall and the upper opening of the tank is exposed when the outer guide wall is lifted from the inner tank wall.

23. A liquid dispenser, including:
    a tank having an upper opening;
    a pump provided in the tank;
    a plate provided above the tank and having a hole;
    a pipe to transfer liquid discharged from the pump to the hole of the plate;
    a plug inserted into the hole of the plate to form a ring-shaped space between the hole of the plate and the plug through which liquid is discharged; and
    a liquid guide provided below the plate to guide liquid dropped from an edge of the plate to the tank, wherein the liquid guide and the plate cover the upper opening of the tank.

* * * * *